(12) United States Patent
Zimmerman et al.

(10) Patent No.: US 9,576,498 B1
(45) Date of Patent: Feb. 21, 2017

(54) SYSTEMS AND METHODS FOR AUTOMATED TRANSCRIPTION TRAINING

(71) Applicant: 3PLAY MEDIA, INC., Cambridge, MA (US)

(72) Inventors: Roger S. Zimmerman, Wellesley, MA (US); Christopher S. Antunes, Arlington, MA (US); Jeremy E. Barron, Medford, MA (US); Sharon Lee Tomasulo, Medford, MA (US); Claudia W. Fiore, Nashua, NH (US); Christopher E. Johnson, Cambridge, MA (US); Anatole Khesin, Somerville, MA (US); Joshua Miller, Charlestown, MA (US)

(73) Assignee: 3Play Media, Inc., Boston, MA (US)

( * ) Notice: Subject to any disclaimer, the term of this patent is extended or adjusted under 35 U.S.C. 154(b) by 331 days.

(21) Appl. No.: 13/839,008

(22) Filed: Mar. 15, 2013

(51) Int. Cl.
G09B 19/00 (2006.01)

(52) U.S. Cl.
CPC .................... G09B 19/00 (2013.01)

(58) Field of Classification Search
CPC ......... G09B 13/02; G09B 13/04; G09B 13/00; G09B 19/06; G06F 17/28
USPC ........................ 434/219, 227, 157
See application file for complete search history.

(56) References Cited

U.S. PATENT DOCUMENTS

| | | | | |
|---|---|---|---|---|
| 3,664,036 A * | 5/1972 | Boswell et al. | ............ | 434/228 |
| 3,894,346 A * | 7/1975 | Ward et al. | ................. | 434/228 |
| 4,035,091 A * | 7/1977 | Townsend | ...................... | 401/52 |
| 4,093,831 A * | 6/1978 | Sharp et al. | .............. | 369/47.55 |
| 4,690,644 A * | 9/1987 | Flanders et al. | .............. | 434/158 |
| 4,768,959 A * | 9/1988 | Sprague et al. | .............. | 434/156 |
| 4,975,894 A * | 12/1990 | Jachmann et al. | ......... | 369/25.01 |
| 5,305,205 A * | 4/1994 | Weber et al. | ................. | 715/234 |
| 6,195,637 B1 | 2/2001 | Ballard et al. | | |
| 6,477,493 B1 * | 11/2002 | Brooks et al. | ................. | 704/246 |
| 6,507,816 B2 * | 1/2003 | Ortega | ......................... | 704/235 |
| 6,622,121 B1 * | 9/2003 | Crepy et al. | ................. | 704/243 |
| 6,980,953 B1 * | 12/2005 | Kanevsky et al. | ........... | 704/235 |
| 7,006,967 B1 * | 2/2006 | Kahn et al. | ................... | 704/235 |
| 7,072,836 B2 * | 7/2006 | Shao | ........................... | 704/255 |
| 7,181,413 B2 * | 2/2007 | Hadden et al. | .............. | 705/7.42 |
| 7,260,534 B2 * | 8/2007 | Gandhi et al. | ............... | 704/270 |
| 8,306,816 B2 * | 11/2012 | Goldberg | ..................... | 704/235 |
| 8,337,208 B1 * | 12/2012 | Thirumalainambi et al. | ............................. | 434/219 |
| 8,583,433 B2 * | 11/2013 | Webb et al. | .................. | 704/235 |
| 8,762,289 B2 * | 6/2014 | Jones et al. | .................... | 705/328 |
| 2003/0065503 A1 * | 4/2003 | Agnihotri et al. | ................ | 704/7 |
| 2004/0064317 A1 | 4/2004 | Othmer et al. | | |
| 2005/0197836 A1 * | 9/2005 | Cohen et al. | ................. | 704/251 |
| 2006/0167686 A1 * | 7/2006 | Kahn | ........................... | 704/235 |
| 2006/0190249 A1 | 8/2006 | Kahn et al. | | |
| 2007/0208567 A1 * | 9/2007 | Amento et al. | ............... | 704/270 |
| 2008/0160491 A1 * | 7/2008 | Allen et al. | ................... | 434/362 |
| 2009/0106312 A1 * | 4/2009 | Breslau et al. | ............ | 707/104.1 |
| 2009/0271192 A1 * | 10/2009 | Marquette et al. | ........... | 704/235 |
| 2011/0161082 A1 * | 6/2011 | Braho et al. | .................. | 704/251 |

\* cited by examiner

*Primary Examiner* — Sam Yao
*Assistant Examiner* — Michael Humphrey
(74) *Attorney, Agent, or Firm* — Finch & Maloney PLLC

(57) ABSTRACT

According to one embodiment, a system for training transcription system trainees is provided. The system includes a memory, at least one processor coupled to the memory, and a training component executable by the at least one processor. The training component is configured to evaluate performance of at least one transcription system trainee.

26 Claims, 16 Drawing Sheets

3PlayMedia　　Home　　Meesage Board (39)　　Market　　Profile　　Resources

Editing

Training programs | Editing

Training Completion Deadline: 12:00, Nov 14 2012

Getting Started As An Editor
- Instructions
- Video

Introduction to STOE
- Instructions
- Video
- Exercise

Beginner Editing 1
- Instructions (602)
- Video (604)
- Exercise (606)
- Review (608)
- Feedback (610)

Beginner Editing 2
- Instructions
- Video
- Exercise
- Review
- Feedback

Intermediate Editing

600
Training interface

FIG. 6

900
Human Auditor Job interface

🕮 3PlayMedia    Home    Meesage Board (39)    Market    Profile    Resources

Market | 3Play Audit User

⊗ Single Jobs

Job type: [ ⇅ ]   Project: [ ⇅ ] [Submit]

← Previous [1] 2 Next →

| CLAIM | TYPE | JOB ID | PROJECT NAME | JOB NAME | DURATION | RATE (ADJ) | AMOUNT | DEADLINE | AUTOSCOPE | PRIORITY |
|---|---|---|---|---|---|---|---|---|---|---|
| ≫ | Auditing | 243211 | Training | Step 3 | 00:03:35 | $3.00 | $10.75 | 12:42 AM EST, FEB 13 2013 | 20.25 | ⚑ |
| ≫ | Auditing | 243531 | Training | Step 4 | 00:03:48 | $3.00 | $11.41 | 12:42 AM EST, FEB 13 2013 | 20.00 | ⚑ |
| ≫ | Auditing | 251275 | Training | Step 5 | 00:03:50 | $3.00 | $11.53 | 12:42 AM EST, FEB 13 2013 | 19.50 | ⚑ |
| ≫ | Auditing | 252154 | Training | Step 6 | 00:04:40 | $3.00 | $14.03 | 12:42 AM EST, FEB 13 2013 | 19.00 | ⚑ |
| ≫ | Auditing | 252885 | Training | Step 7 | 00:05:22 | $3.00 | $15.14 | 12:42 AM EST, FEB 13 2013 | 18.50 | |
| ≫ | Auditing | 252902 | Training | Step 3 | 00:03:35 | $3.00 | $10.75 | 12:42 AM EST, FEB 13 2013 | 18.00 | |
| ≫ | Auditing | 253507 | Training | Step 4 | 00:03:48 | $3.00 | $11.41 | 12:42 AM EST, FEB 13 2013 | 16.75 | |

FIG. 9

1100
Example partial Rubric
Part 1

| | A (1104) | B (1106) | C (1108) | D (1110) | E (1112) | F (1114) | G (1116) |
|---|---|---|---|---|---|---|---|
| 1102 → 2 | Importance | Choice1 | Choice2 | Flag OK? | Common Error 1 | Comment 1 | Error Weight 1 |
| 2 | 2 | CFO: | UNIDENTIFIED CO. REPRESENTATIVE: | | NULL | The file instructions call for a speaker ID | 10 |
| 3 | 2 | Thanks, | | | Thanks | Need a comma here. | 2 |
| 4 | 3 | Rob, | | | Ralph, | He says "Rob." | 4 |
| 5 | ... | | | | | | |
| 6 | 2 | fourth | | | 4th | The standards on ordinal numbers explain that they don't follow the "all numbers are written as digits" rule, so this would be fourth. | 2 |
| 7 | 1 | quarter | | | | | |
| 8 | 1 | and | | | | | |
| 9 | 3 | full year | full year | | | | |
| 10 | ... | | | | | | |
| 11 | 2 | approximately | | | | | |
| 12 | 5 | $6.8 million | | | $6.8 million dollars | The dollar sign is another way of writing the word dollars; you need to delete the words in this case. | 8 |

1100
Example partial Rubric
Part 2

| 1118 | | | | | 1120 | 1122 |
|---|---|---|---|---|---|---|
| H | I | J | K | L | M | N |
| Error Type 1 | Comment Error 2 | Comment 2 | Error Weight 2 | Error Type 2 | Begin Time Code | End Time Code |
| standards | | | | | 0090 | 0120 |
| grammar | | | | grammar, punctuation | 0120 | 0180 |
| accuracy | Rob, | This is the end of the sentence. | 3 | | 0190 | 1070 |
| | | | | | | |
| standards | | | | | 6480 | 6760 |
| | | | | | 6760 | 7380 |
| | | | | | 7380 | 7630 |
| | | | | | 7630 | 8120 |
| | | You need to use the dollar sign instead of the wod dollars, even in a | | | | |
| standards | 6.8 million dollars | verbatim file. | 15 | standards | 29520 | 30080 |
| standards | | | | | 30120 | 31570 |

1124

From FIG. 11A

FIG. 11B

| Month | Trainees | Complete | <3 days | <5 days | <8 days | <10 days | <15 days | <20 days | <30 days | <50 days | <100 days | # Audits | # Auto Passed | Auditing Cost | Avg Time | Audits/Trainee | Cost/Trainee | Cost/Editor |
|---|---|---|---|---|---|---|---|---|---|---|---|---|---|---|---|---|---|---|
| Apr | 25 | 6 | 0 | 0 | 1 | 1 | 3 | 4 | 6 | 6 | 6 | 50 | 0 | $ 611.57 | 16.9 | 2.00 | $24.46 | $101.93 |
| May | 70 | 24 | 0 | 0 | 2 | 6 | 13 | 15 | 22 | 24 | 24 | 214 | 0 | $ 2,681.88 | 18.2 | 3.06 | $38.31 | $111.75 |
| Jun | 2 | 2 | 0 | 0 | 0 | 0 | 0 | 0 | 1 | 1 | 1 | 10 | 0 | $ 127.72 | 12.8 | 5.00 | $63.86 | $63.86 |
| Aug | 51 | 23 | 0 | 0 | 1 | 2 | 6 | 9 | 15 | 15 | 16 | 120 | 17 | $ 1,486.16 | 15.2 | 2.02 | $29.14 | $64.62 |
| Oct | 119 | 67 | 0 | 0 | 3 | 12 | 20 | 36 | 45 | 53 | 54 | 370 | 101 | $ 4,584.74 | 16.7 | 2.26 | $38.53 | $68.43 |
| Nov | 52 | 41 | 0 | 0 | 1 | 5 | 8 | 15 | 28 | 32 | 32 | 185 | 44 | $ 2,327.78 | 17.1 | 2.71 | $44.77 | $56.78 |
| Dec | 2 | 1 | 0 | 0 | 0 | 1 | 1 | 1 | 1 | 1 | 1 | 4 | 2 | $ 22.22 | 9.5 | 1.00 | $11.11 | $22.22 |
| Jan | 2 | 2 | 0 | 0 | 0 | 1 | 1 | 2 | 2 | 2 | 2 | 10 | 3 | $ 127.72 | 13.5 | 3.50 | $63.86 | $63.86 |

FIG. 14A

| BEFORE: | |
|---|---|
| Completion % | 33% |
| Avg Time | 17.64 |
| Audits/Trainee | 2.82 |
| Cost/Trainee | $35.27 |
| Cost/Editor | $106.91 |
| AFTER: | |
| Completion % | 59% |
| Avg Time; | 16.46 |
| Audits/Trainee | 2.31 |
| Cost/Trainee | $37.83 |
| Cost/Editor | $63.80 |

FIG. 14B

SYSTEMS AND METHODS FOR AUTOMATED TRANSCRIPTION TRAINING

NOTICE OF MATERIAL SUBJECT TO COPYRIGHT PROTECTION

Portions of the material in this patent document are subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. §1.14.

BACKGROUND

Technical Field

The technical field relates generally to transcription of content and, more particularly, to systems and methods that provide for training of transcription processes.

Background Discussion

Transcription of internet-hosted media (video and audio) is increasingly in demand. Consumers of such media often prefer having captions available to them, and in some cases (e.g. for the hearing impaired), they require it. New federal and state regulations mandating accessibility to online media are also driving this demand. Additionally, transcription of online content makes possible applications that are difficult if not impossible without transcriptions. For example, television and radio post-production usually require transcriptions of all recorded material so that the producer can easily select segments for the final product. Market research firms use transcriptions of focus group video to search for sections of the videos in which consumers are discussing a certain product. Similar search applications are enticing for institutions with large video archives, such as universities and governments.

However, transcription is expensive. Typically, services for high-quality transcription creation can cost several hundreds of dollars per hour of content. For some types of content, special expertise is needed to create accurate transcriptions. Keeping up with demand for performing transcription services requires organizations to train new editors, new quality assurance specialists, and new auditors. The manual auditing of trainees' work is a time consuming process requiring considerable efforts on the part of qualified auditors. Auditor time might be better utilized completing transcription work for paying customers. Staffing latencies are introduced related to limited availability of qualified auditors capable of performing trainee audits, as well as proficient trainees efficiently completing training exercises but gated by audits from progressing through their training. Both factors limit the ability of an organization to meet customer needs.

SUMMARY

At least some aspects and embodiments disclosed herein provide for a computer system that addresses these challenges. For instance, one such system is provided by 3Play Media of Cambridge, Mass. The 3Play Media system provides a directed series of lessons that guides a new trainee (e.g., a transcription editor) through the process of electronic transcription of video and audio media. In addition, the 3Play Media system provides a transcription editing platform that optimizes correction of automatic speech recognition output to create a high-quality transcript. Trainees using this platform are provided lessons on how to edit drafts of text produced by automatic speech recognition software systems as the associated media files from 3Play Media's server. Trainees are monitored and scored on their performance in an automated fashion and progress through the training lessons according to various thresholds set by a system administrator. As determined by these thresholds, the transcription output produced by a trainee may be sent to a human auditor for additional evaluation and commentary before returning feedback to a trainee. This platform is optimized to reduce the time it takes to bring a new trainee up to speed in becoming a market qualified electronic transcriber.

According to one embodiment, a system for training transcription system trainees is provided. The system includes a memory, at least one processor coupled to the memory, and a training component executable by the at least one processor. The training component is configured to evaluate performance of at least one transcription system trainee.

In the system, the at last one transcription system trainee may include at least one transcription editor. The training component may be configured to evaluate the performance by comparing a rubric to data descriptive of work product created by the at least one transcription system trainee.

The system may further comprise a trainee interface configured to receive information descriptive of the work product. The work product may include at least one of an edited transcript, a set of captions, and a transcript annotated with metadata. The trainee interface may be further configured to receive comments regarding the rubric from an external entity and notify another external entity of the comments via an administrator interface.

In the system, the training component may be further configured to compute a total number of comments received regarding the rubric and modify the rubric if the total number transgresses a predetermined threshold.

The system may further comprise an auditor interface configured to present information descriptive of the performance to an external entity. The auditor interface may be further configured to receive feedback regarding the performance from the external entity.

In the system, the training component may be further configured to identify the performance as being at least one of a failure, a success, and requiring further analysis. The training component may be configured to identify the performance by, at least in part, computing a score indicative of the performance. The training component may be further configured to generate comments regarding the performance that include information from the work product.

According to another embodiment, a method for training transcription system trainees using a computer system is provided. The method includes an act of evaluating, by the computer system, performance of at least one transcription system trainee.

In the method, the act of evaluating the performance may include an act of evaluating performance of at least one transcription editor. The act of evaluating the performance may include comparing a rubric to data descriptive of work product created by the at least one transcription system trainee.

The method may further include an act of receiving information descriptive of the work product. The act of comparing the rubric to the data descriptive of work product may include an act of comparing the rubric to data descriptive of at least one of an edited transcript, a set of captions, and a transcript annotated with metadata.

The method may further include acts of receiving comments regarding the rubric from an external entity and notifying another external entity of the comments via an administrator interface. The method may further include acts of computing a total number of comments received regarding the rubric and modifying the rubric if the total number transgresses a predetermined threshold. The method may further include an act of presenting information descriptive of the performance to an external entity.

The method may further include an act of receiving feedback regarding the performance from the external entity. The method may further include an act of identifying the performance as being at least one of a failure, a success, and requiring further analysis. In the method, the act of identifying the performance may include computing a score indicative of the performance. The method may further include an act of generating comments regarding the performance that include information from the work product.

According to another embodiment, a non-transitory computer readable medium is provided. The computer readable medium stores instructions for executing a training process for transcription system trainees. The instructions are executable by at least one processor of a computer system. The instructions instruct the computer system to evaluate performance of at least one transcription system trainee. The instructions to evaluate the performance may include instructions to compare a rubric to data descriptive of work product created by the at least one transcription system trainee.

Still other aspects, embodiments and advantages of these exemplary aspects and embodiments, are discussed in detail below. Moreover, it is to be understood that both the foregoing information and the following detailed description are merely illustrative examples of various aspects and embodiments, and are intended to provide an overview or framework for understanding the nature and character of the claimed aspects and embodiments. Any embodiment disclosed herein may be combined with any other embodiment. References to "an embodiment," "an example," "some embodiments," "some examples," "an alternate embodiment," "various embodiments," "one embodiment," "at least one embodiment," "this and other embodiments" or the like are not necessarily mutually exclusive and are intended to indicate that a particular feature, structure, or characteristic described in connection with the embodiment may be included in at least one embodiment. The appearances of such terms herein are not necessarily all referring to the same embodiment.

BRIEF DESCRIPTION OF DRAWINGS

Various aspects of at least one embodiment are discussed below with reference to the accompanying figures, which are not intended to be drawn to scale. The figures are included to provide an illustration and a further understanding of the various aspects and embodiments, and are incorporated in and constitute a part of this specification, but are not intended as a definition of the limits of any particular embodiment. The drawings, together with the remainder of the specification, serve to explain principles and operations of the described and claimed aspects and embodiments. In the figures, each identical or nearly identical component that is illustrated in various figures is represented by a like numeral. For purposes of clarity, not every component may be labeled in every figure. In the figures:

FIG. 6 is an illustration of a user interface for the editing portion of a transcription training program as provided by a trainee interface;

FIG. 9 is a depiction of a user interface for summarizing and selecting transcription jobs to be audited by a human auditor;

FIG. 11A is a depiction of a user interface for a partial transcription rubric;

FIG. 11B is a further depiction of a user interface for a partial transcription rubric;

FIG. 14A is a table of metrics that illustrates improvements gained by implementation of an exemplary automated transcription training system; and FIG. 14B is another table of metrics that illustrates improvements gained by implementation of an exemplary automated transcription training system.

DETAILED DESCRIPTION

Figure 1:
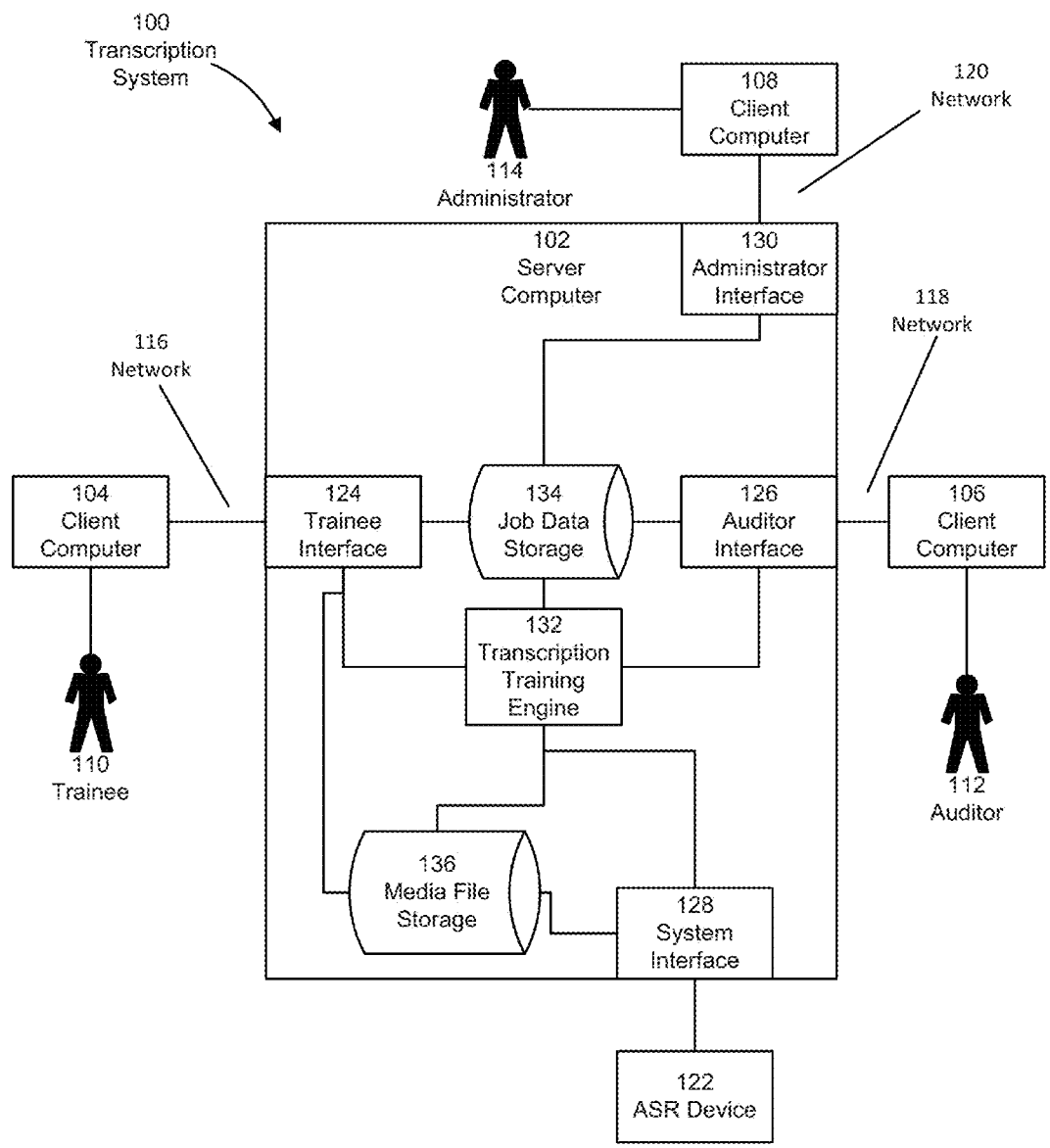
FIG. 1 is a context diagram including an exemplary automated transcription training system.

At least one embodiment disclosed herein includes apparatus and processes for implementing, using a computer system, automated transcription training. In some embodiments, a set of rubrics are created for a sequence of lessons for performing electronic transcription of media files that include audio files, audio/video files, or the like. Each rubric for a particular media file includes at least one correct transcription of that media file from a possible plurality of correct transcriptions for that same media file. In some embodiments, an automated transcription training system leads a trainee through a series of instructions on the use of an electronic transcription system as well as a set of lessons where a trainee uses those instructions to perform electronic transcription. In these embodiments, the automated transcription training system creates jobs associated with the set of media files to be transcribed that are incorporated into a series of exercises. Each exercise involves the completion of one transcription job. In some embodiments, the automated transcription training system provides tools to be used by trainees that allow for the completion of transcription exercises.

In other embodiments, the automated transcription training system performs an automated auditing of the work product output produced by a trainee. A work product output might include a textual transcript produced by a trainee, as well as metadata annotations, flags and comments that are submitted in association with a transcript for a particular media file. These embodiments may include scoring and correction processes that rate the trainee on performance as well as provide textual feedback related to the trainee's performance on particular transcription tasks. In some embodiments, the automated transcription training system automatically controls the progression or non-progression of a trainee through the transcription training program based on scores calculated during an automated auditing process.

In some embodiments, a trainee is determined not to be suitable for continued progress due to a low score or a sequence of low scores. In other embodiments, a trainee is determined to be very suitable for progress as a result of a high score or a sequence of high scores and is able to advance through the training program without the need for human intervention in the training process. In some embodiments, a score or sequences of scores computed during the training process indicates a need for a human to perform an audit of the trainee's transcription output prior to returning feedback to the trainee and allowing the trainee to advance.

Examples of the methods and systems discussed herein are not limited in application to the details of construction and the arrangement of components set forth in the following description or illustrated in the accompanying drawings. The methods and systems are capable of implementation in other embodiments and of being practiced or of being carried out in various ways. Examples of specific implementations are provided herein for illustrative purposes only and are not intended to be limiting. In particular, acts, components, elements and features discussed in connection with any one or more examples are not intended to be excluded from a similar role in any other examples.

Also, the phraseology and terminology used herein is for the purpose of description and should not be regarded as limiting. Any references to examples, embodiments, components, elements or acts of the systems and methods herein referred to in the singular may also embrace embodiments including a plurality, and any references in plural to any embodiment, component, element or act herein may also embrace embodiments including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms.

Automated Transcription Training System

Various embodiments implement a transcription system using one or more computer systems. FIG. 1 illustrates one of these embodiments, a transcription system 100. As shown, FIG. 1 includes a server computer 102, client computers 104, 106, and 108, a trainee 110 (e.g. transcriptionists, transcription editor, and the like), a human auditor 112, an administrator 114, networks 116, 118 and 120, and an automatic speech recognition (ASR) device 122. The server computer 102 includes several components: a trainee interface 124, an auditor interface 126, a system interface 128, an administrator interface 130, a transcription training engine 132, a job data storage 134, and a media file storage 136.

As shown in FIG. 1, the system interface 128 exchanges (i.e. sends or receives) media file information with the ASR device 122. The trainee interface 124 show in FIG. 1 exchanges information with the client computer 104 via the network 116. The auditor interface 126 of FIG. 1 exchanges information with the client computer 106 via the network 118. The networks 116, 118 and 120 may include any communication network through which computer systems may exchange information. For example, the network 116, the network 118, and the network 120 may be a public network, such as the internet, and may include other public or private networks such as LANs, WANs, extranets and intranets.

Information within the transcription training system 100 of FIG. 1, including data within the job data storage 134 and the media file storage 136, may be stored in any logical construction capable of holding information on a computer readable medium including, among other structures, file systems, flat files, indexed files, hierarchical databases, relational databases or object oriented databases. The data may be modeled using unique and foreign key relationships and indexes. The unique and foreign key relationships and indexes may be established between the various fields and tables to ensure both data integrity and data interchange performance. In one embodiment, the media file storage 136 includes a file system configured to store media files and other transcription system data and acts as a file server for other components of the transcription system. In another embodiment, the media file storage 136 includes identifiers for files stored on another computer system configured to serve files to the components of the transcription system.

Information may flow between the components illustrated in FIG. 1, or any of the elements, components and subsystems disclosed herein, using a variety of techniques. Such techniques include, for example, passing the information over a network using standard protocols, such as TCP/IP or HTTP, passing the information between modules in memory and passing the information by writing to a file, database, data store, or some other non-volatile data storage device. In addition, pointers or other references to information may be transmitted and received in place of, in combination with, or in addition to, copies of the information. Conversely, the information may be exchanged in place of, in combination with, or in addition to, pointers or other references to the information. Other techniques and protocols for communicating information may be used without departing from the scope of the examples and embodiments disclosed herein.

One goal of the transcription training system 100 is to receive media files from an external source and to produce transcriptions of the content included in the media files that can be used for the training of new transcription trainees for editing these files. Another goal of the transcription training system is to train transcription editors in the process of producing new media transcripts. One vehicle used by the transcription system 100 to achieve both of these goals is a transcription job. Within the transcription training system 100, transcription jobs are associated with media files and are capable of assuming several states during processing. Processing of media files can be performed by a technique such as described in co-pending U.S. patent application Ser. No. 13/246,133, entitled "ELECTRONIC TRANSCRIPTION JOB MARKET," ("the '123 Application") which is hereby incorporated by reference in its entirety. The resulting processed files can then be used for the creation of transcription lessons and rubrics for those lessons as described in more detail below.

According to various embodiments illustrated by FIG. 1, the transcription training engine 132 is configured to both manage the delivery of training of new users for the transcription training program provided by the transcription training system 100 and to maintain the efficient delivery of feedback to trainees once the transcription training system is operational for multiple trainees and auditors using the system concurrently. To achieve these goals, in some embodiments, the transcription training engine 132 exchanges training job information with the administrator interface 130, the auditor interface 126, the system interface 128, the job data storage 134 and the media file storage 136. Training job information may include any information used to maintain the transcription training system or stored within the job data storage 134. Specific examples of transcription training system information include a media file information, job information, trainee information, auditor information and administrator information. This information is described further below with reference to FIG. 2.

Figure 2:
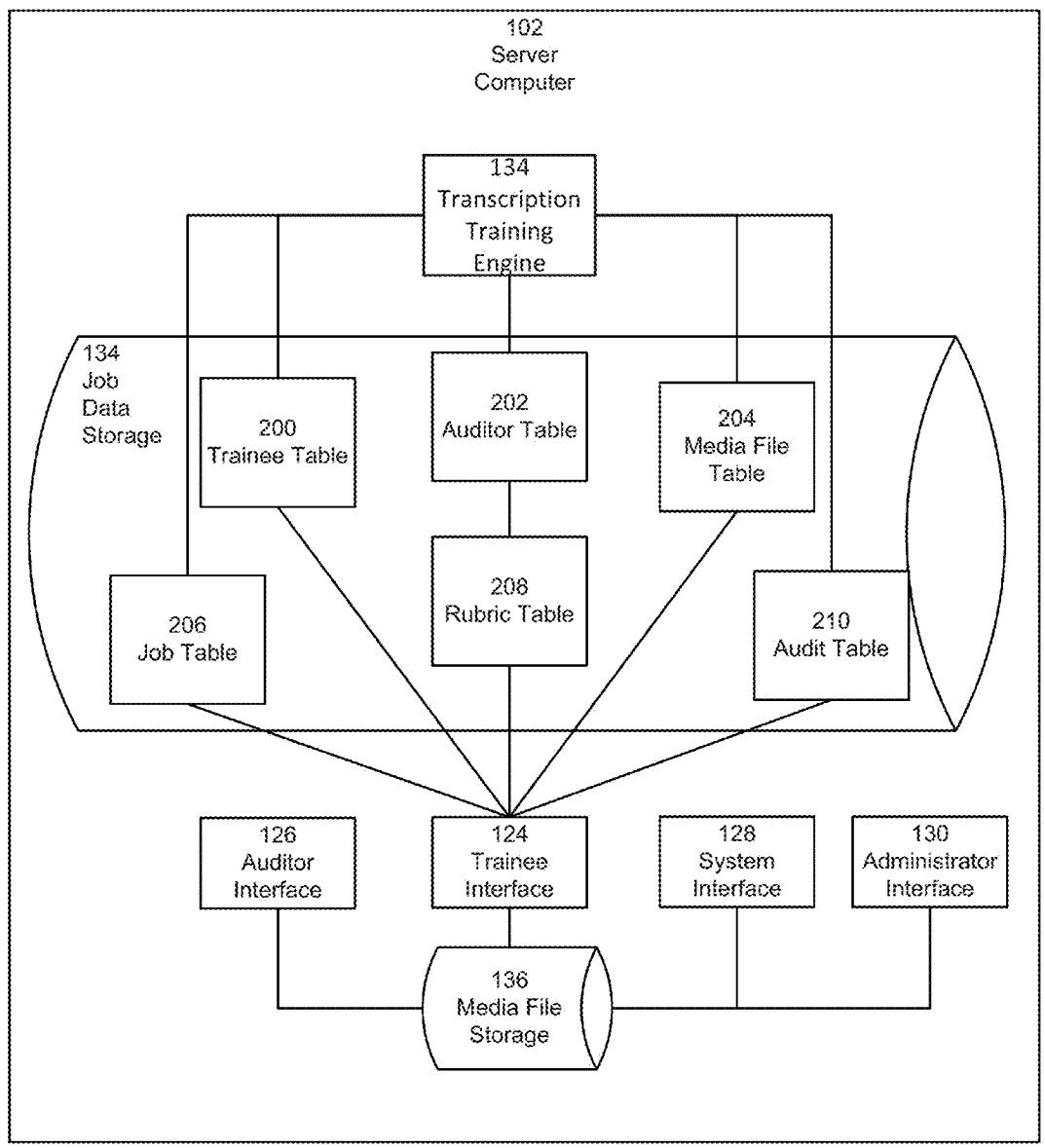
FIG. 2 is a schematic diagram of the server computer shown in FIG. 1.

FIG. 2 illustrates the server computer 102 of FIG. 1 in greater detail. As shown in FIG. 2, the server computer 102 includes the transcription training engine 132, the job data storage 134, the trainee interface 124, the system interface 128, the auditor interface 126, administrator interface 130, and the media file storage 136 components originally presented in FIG. 1. In the embodiment illustrated in FIG. 2, the job data storage 134 includes a trainee table 200, an auditor table 202, a media file table 204, a job table 206, a rubric table 208, and an audit table 210.

In the embodiment of FIG. 2, the trainee table 200 stores information descriptive of trainees who access the transcription training system to learn the process of transcribing media files. In at least one embodiment, each row of the trainee table 200 stores information for a trainee and includes a trainee_user_id field, a trainee_user_name field, and a trainee_email_address field. The trainee_user_id field stores an identifier of a trainee that is unique within the transcription training system. The trainee_user_name field stores information that represents the trainee's name within the transcription training system. The trainee_email_address field stores information that represents the trainee's associated e-mail address. The trainee_user_id field is used as a key by a variety of functions disclosed herein to identify information associated with a particular trainee. The trainee_email_address field is used by a variety of functions that create and send communications to a trainee regarding system status and feedback availability.

The auditor table 202 stores information descriptive of the auditors who perform auditing of the results from trainee transcription output. In at least one embodiment, each row of the auditor table 202 stores information for an auditor and includes an auditor_id field, an auditor_name field, and an auditor_email_address field. The auditor_id field stores an identifier of the customer that is unique within the transcription training system. The auditor_name field stores information that represents the auditor's name within the transcription training system. The auditor_id field is used as a key by a variety of functions disclosed herein to identify information associated with a particular auditor. The auditor_email_address field is used by a variety of functions that create and send communications to an auditor regarding system status, job availability, and submitted trainee comments.

The media file table 204 stores information descriptive of the media files that have been uploaded to the transcription job market for transcription. In at least one embodiment, each row of the media file table 204 stores information for one media file and includes the following fields: file_id, draft_transcript_location, and edited_transcript_location. The file_id field stores a unique identifier of the media. The draft_transcript_location field stores an identifier of a location of draft transcript information associated with the media file. In some embodiments, the draft_transcript_location might contain a value that directs the system to transcripts produced by an ASR device. In other embodiments, the draft_transcript_location field might contain a value that directs the system to transcripts that were produced manually by an Administrator. The edited_transcript_location field stores an identifier of a location of edited draft transcript information associated with the media file. The file_id field is used as a key by a variety of functions disclosed herein to identify information associated with a particular media file.

The job table 206 stores information descriptive of jobs to be completed within the transcription training system. In at least one embodiment, each row of the job table 204 stores information for one job and includes the following fields: job_id, file_id, deadline, state, job_type, pay_rate, trainee_user_id, progress, flags, XRT, corrections, auto_audit_score, and hide. The job_id field stores an identifier of the job that is unique within the transcription job market. The file_id field stores the unique identifier of the media file to be transcribed by a trainee working on the job. The deadline field stores information that represents the date by which the job must be complete. The state field store the current state (or status) of the job. Examples values for the state field include New, Available, Assigned, In_Progress, and Complete. The job_type field stores information that represents a type of work that must be performed to complete the job, for example editing, QA, auditing, etc. The pay_rate field stores information that represents a pay rate for completing the job. The trainee_user_id field stores the unique identifier of the trainee who has worked on this job. The progress field stores information that represents an amount of work completed for the job. The flags field stores information that represents the number and type of flags assigned to the job during editing, as described above. The XRT field stores information that represents the times-real-time statistic applicable to the job. The corrections field stores information that represents corrections made to the draft transcription as part of the job. The auto_audit_scores field stores information that represents the results of automated auditing of the job. The hide field stores information that determines whether components, such as the transcription training engine 132, the trainee interface 124, and the auditor interface 126, should filter the job from a job view. The job_id field is used as a key by a variety of functions disclosed herein to identify information associated with a particular job.

The rubric table 208 stores information descriptive of rubrics created to encode a correct transcription or possibly several alternative correct transcriptions for a particular media file. A partial example of a rubric table 208 is shown in FIG. 11A and FIG. 11B. In at least one embodiment, each row 1102 of the rubric table 208 stores information for one segment of a rubric and includes the following fields: lesson_id, file_id, importance, choice1, choice2, flag_ok, common_error1, comment1, error_weight1, error_type1, begin_time_code, end_time_code. In further embodiments, as many additional "choice" fields, such as choice3, choice4, choice5, may be present in the rubric table 208. In further embodiments, as many additional numbered sets of "common_error," "comment," "error_weight," and "error_type" fields may be present in the rubric table 208. The lesson_id field stores an identifier that identifies a particular rubric. The file_id field stores an identifier that associates a rubric segment with a particular media file from the media file table 204. The importance field 1104 stores an identifier of the relative weight of a transcript fragment. The choice1 field 1106 stores a text string representing a correct transcript fragment for the training exercise at a point in the sequence of transcript fragments. The choice2 field 1108 stores a text string for an alternative transcript fragment at that point in the sequence. The transcript fragments contained within choice field column entries are interpreted as space separated textual tokens. Concatenating all entries in a choice column produces a valid transcription. The flag_ok field 1110 stores a Boolean identifier indicating whether a trainee can flag the associated region within the transcript. If the flag_ok field is set to have a value of "true," then associated flags set by a trainee are interpreted as being valid for that particular transcript segment. In some embodiments, flags set by a trainee might include: "[UNINTELLIGIBLE]," "[INAUDIBLE]," or "[?<text>?]" where the included text is a trainee's best guess at the words spoken in a particular segment. In some embodiments, depending on the configuration of an automated audit, a flagged text region may be treated as an error with a low weight assigned.

In some embodiments, the common_error1 field 1112 of a rubric table 208 stores a text string of a regular expression for an anticipated error mode for the transcript region. The comment1 field 1114 stores a text string providing an annotation that is associated with the common_error1 field to be used within an audit user interface described in more detail below. The error_weight1 field 1116 stores a weighting value applied to the error text within common_error1 that is used in an overall score computation as described in more detail below. The error_type1 field 1118 stores an identifier of the category of error present in common_error1 that is used in computing category sub-scores as described in more detail below. The begin_time_code field 1120 stores a value for the starting time at which a particular word or phrase was spoken within the associated media file. The end_time_code field 1122 stores a value for the ending time at which a particular was spoken within the associated media file.

In further embodiments where additional numbered sets of "choice," "common_error," "comment," "error_weight," and "error_type" field values 1124 are utilized, their respective meanings are interpreted in the same manner as their "choice1," "common_error1," "comment1," "error_weight1," and "error_type1" counterparts. In some embodiments, when a NULL token is present within any "choice" field column, the NULL token is indicative of no entered text being an appropriate entry in the trainee's transcript for that segment. In further embodiments, regular expressions within a "choice" field column may be used to support option entries for a particular transcript segment. An example of a regular expression might be "(done\. The)|(done, the)." In some embodiments, the use of a NULL token within a "common_error" column might indicate a requirement that text should be present in a trainee's transcript for that particular transcript segment.

The audit table 210 stores information descriptive of an audit of a trainee's output that has been performed either by the automated transcription training engine 132 or by a human auditor 112. In at least one embodiment, each row of the audit table stores information for one audit and includes the following fields: audit_id, trainee_user_id, auditor_id, edit_job_id, lesson_id, score_overall, score_accuracy, score_standards, score_grammar, score_flags, score_sync, original_score_overall, original_score_sync, comments, annotations, auto_pass. The audit_id field stores an identifier of an audit that is unique within the automated transcription training system. The trainee_user_id field stores the user identifier of the trainee who performed the training exercise with which the audit is associated. The auditor_id field stores the user identifier of the auditor who performed the audit. In some embodiments, in the case of an auto-audit the identifier contained by this field may be that of the "3Play Automated Auditor."

In some embodiments, an Audit Table's edit_job_id field stores the job identifier of the associated training exercise editing job on which an audit is performed. The lesson_id field stores an identifier of the rubric to use for the auto-audit process. The score_overall field stores the overall score of the audit that is computed by the auto-audit process in a manner described below or from the sum of the human auditor's category scores. The score_accuracy field stores the accuracy category sub-score that is computed by the auto-audit process or entered by the human auditor. The score_standards field stores the standards category sub-score that is computed by the auto-audit process or entered by the human auditor. The score_flags field stores the flags category sub-score that is computed by the auto-audit process or entered by the human auditor. The score_sync field stores the sync category sub-score that is computed by the auto-audit process or entered by the human auditor. The original_score_overall field stores the overall score computed by the auto-auditing process. If an audit never goes to a human auditor, then this score will be the same as that stored by the score_overall field.

In further embodiments, an Audit Table's original_score_sync field stores the sync score computed by the auto-audit process. In some embodiments, if an audit is never directed to a human auditor, then the original_score_sync field stores the same value stored in the score_sync field described above. The comments field stores a data structure containing the overall comments and category commentary ("auditor comments") either from the auto-audit process or as modified by a human auditor. In some embodiments, the data structure stored in the comments field may be in JSON or similar object formats. The annotations field stores a data structure containing the transcript correction comments. In some embodiments, the data structure stored in the annotations field may be in JSON or similar object formats. In further embodiments, the annotations field may be hash keyed on field values begin_time_code and end_time_code from the currently associated rubric table entry, so that each comment may be associated with a region of the time-coded transcript. The auto_pass field stores a Boolean value representing whether the audit was entirely automatically generated enabling a trainee to continue to the next lesson without requiring a human audit of the associated job. Routing logic that can determine whether or not a trainee is automatically passed is described in more detail below.

In some embodiments, the same database table structure is used for performing auto-audits as for performing human audits. In some embodiments, the score_overall, score_accuracy, score_standards, score_grammar, score_flags, score_sync, comments, and annotations fields may be overwritten in the process of a human audit. In further embodiments, a separate record, with a distinct audit_id, may be maintained in a database for an auto-audit and a human audit. In some embodiments, when distinct database records are maintained for separate human and auto-audit processes, an additional field named "active" is added to the Audit Table 210. In some embodiments, if a human audit is performed, then the active field stores a Boolean with a value of True representing a human audit and a value of False representing an auto-audit.

In some embodiments, an Audit Table 210 may be joined to a Trainee Table 200 through the use of the trainee_user_id. In further embodiments, an Audit Table 210 may be joined to an Auditor Table 202 through the use of the auditor_id field.

In some embodiments, the Trainee Table 200 and Auditor Table 202 may be combined into a single User Table that maintains a single user_id field combining the trainee_user_id from Trainee Table 200 and auditor_id from Auditor Table 202 into a single field, as well as a single user_name field combining the trainee_user_name from Trainee Table 200 and auditor_name from Auditor Table 202 into a single field.

Embodiments of the transcription system 100 are not limited to the particular configuration illustrated in FIGS. 1 and 2. Various examples utilize a variety of hardware components, software components and combinations of hardware and software components configured to perform the processes and functions described herein. In some examples, the transcription training system 100 is implemented using a distributed computer system, such as the distributed computer system described further below with regard to FIG. 3.

Computer System

As discussed above with regard to FIG. 1, various aspects and functions described herein may be implemented as specialized hardware or software components executing in one or more computer systems. There are many examples of computer systems that are currently in use. These examples include, among others, network appliances, personal computers, workstations, mainframes, networked clients, servers, media servers, application servers, database servers and web servers. Other examples of computer systems may include mobile computing devices, such as cellular phones and personal digital assistants, and network equipment, such as load balancers, routers and switches. Further, aspects may be located on a single computer system or may be distributed among a plurality of computer systems connected to one or more communications networks.

For example, various aspects and functions may be distributed among one or more computer systems configured to provide a service to one or more client computers, or to perform an overall task as part of a distributed system. Additionally, aspects may be performed on a client-server or multi-tier system that includes components distributed among one or more server systems that perform various functions. Consequently, examples are not limited to executing on any particular system or group of systems. Further, aspects and functions may be implemented in software, hardware or firmware, or any combination thereof. Thus, aspects and functions may be implemented within methods, acts, systems, system elements and components using a variety of hardware and software configurations, and examples are not limited to any particular distributed architecture, network, or communication protocol.

Figure 3:
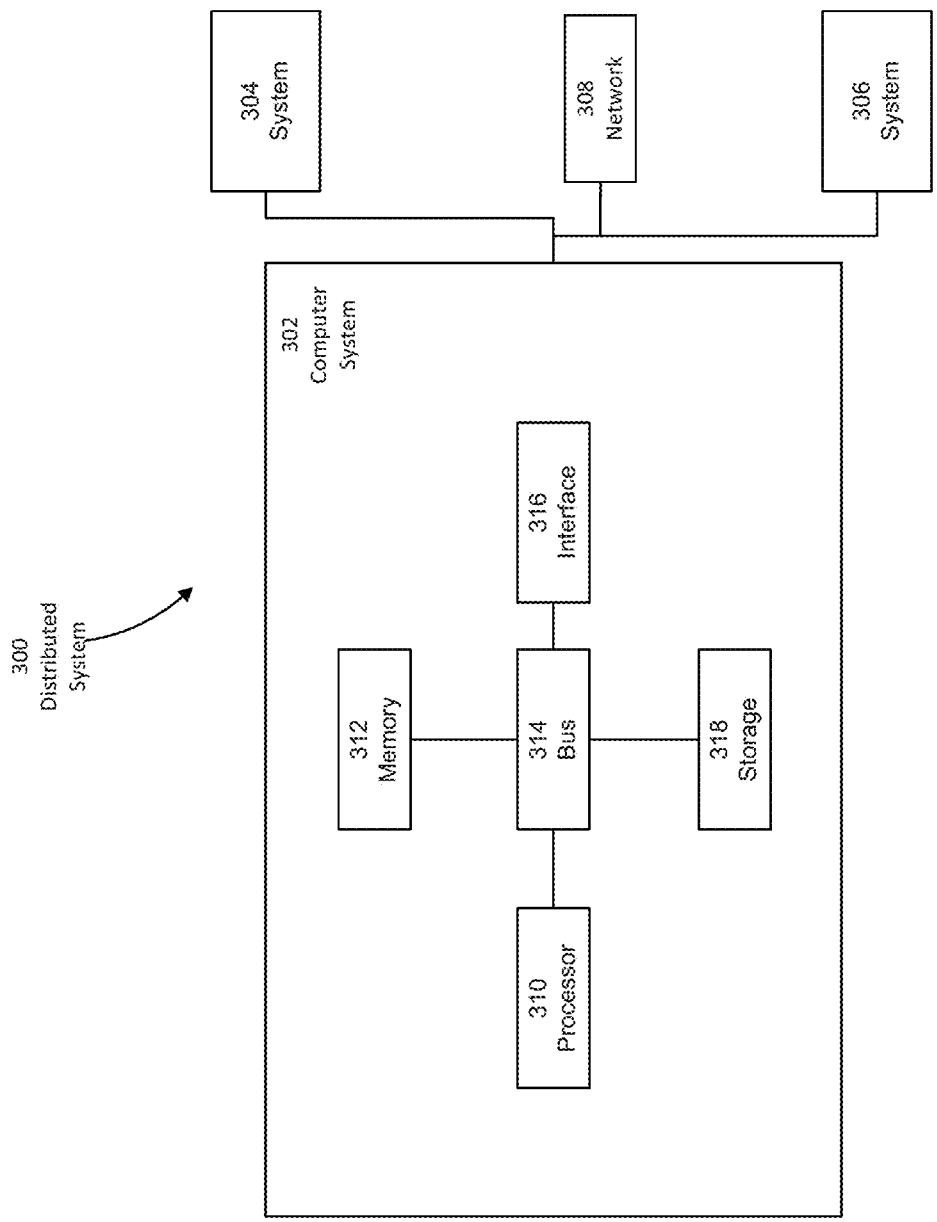
FIG. 3 is a schematic diagram of one example of a computer system that may perform processes and functions disclosed herein.

Referring to FIG. 3, there is illustrated a block diagram of a distributed computer system 300, in which various aspects and functions are practiced. As shown, the distributed computer system 300 includes one more computer systems that exchange information. More specifically, the distributed computer system 300 includes computer systems 302, 304 and 306. As shown, the computer systems 302, 304 and 306 are interconnected by, and may exchange data through, a communication network 308. The network 308 may include any communication network through which computer systems may exchange data. To exchange data using the network 308, the computer systems 302, 304 and 306 and the network 308 may use various methods, protocols and standards, including, among others, Fibre Channel, Token Ring, Ethernet, Wireless Ethernet, Bluetooth, IP, IPV6, TCP/IP, UDP, DTN, HTTP, FTP, SNMP, SMS, MMS, SS7, JSON, SOAP, CORBA, REST and Web Services. To ensure data transfer is secure, the computer systems 302, 304 and 306 may transmit data via the network 308 using a variety of security measures including, for example, TLS, SSL or VPN. While the distributed computer system 300 illustrates three networked computer systems, the distributed computer system 300 is not so limited and may include any number of computer systems and computing devices, networked using any medium and communication protocol.

As illustrated in FIG. 3, the computer system 302 includes a processor 310, a memory 312, a bus 314, an interface 316 and data storage 318. To implement at least some of the aspects, functions and processes disclosed herein, the processor 310 performs a series of instructions that result in manipulated data. The processor 310 may be any type of processor, multiprocessor or controller. Some exemplary processors include commercially available processors such as an Intel Xeon, Itanium, Core, Celeron, or Pentium processor, an AMD Opteron processor, a Sun UltraSPARC or IBM Power5+ processor and an IBM mainframe chip. The processor 310 is connected to other system components, including one or more memory devices 312, by the bus 314.

The memory 312 stores programs and data during operation of the computer system 302. Thus, the memory 312 may be a relatively high performance, volatile, random access memory such as a dynamic random access memory (DRAM) or static memory (SRAM). However, the memory 312 may include any device for storing data, such as a disk drive or other non-volatile storage device. Various examples may organize the memory 312 into particularized and, in some cases, unique structures to perform the functions disclosed herein. These data structures may be sized and organized to store values for particular data and types of data.

Components of the computer system 302 are coupled by an interconnection element such as the bus 314. The bus 314 may include one or more physical busses, for example, busses between components that are integrated within a same machine, but may include any communication coupling between system elements including specialized or standard computing bus technologies such as IDE, SCSI, PCI and InfiniBand. The bus 314 enables communications, such as data and instructions, to be exchanged between system components of the computer system 302.

The computer system 302 also includes one or more interface devices 316 such as input devices, output devices and combination input/output devices. Interface devices may receive input or provide output. More particularly, output devices may render information for external presentation. Input devices may accept information from external sources. Examples of interface devices include keyboards, mouse devices, trackballs, microphones, touch screens, printing devices, display screens, speakers, network interface cards, etc. Interface devices allow the computer system 302 to exchange information and to communicate with external entities, such as users and other systems.

The data storage 318 includes a computer readable and writeable nonvolatile, or non-transitory, data storage medium in which instructions are stored that define a program or other object that is executed by the processor 310. The data storage 318 also may include information that is recorded, on or in, the medium, and that is processed by the processor 310 during execution of the program. More specifically, the information may be stored in one or more data structures specifically configured to conserve storage space or increase data exchange performance. The instructions may be persistently stored as encoded signals, and the instructions may cause the processor 310 to perform any of the functions described herein. The medium may, for example, be optical disk, magnetic disk or flash memory, among others. In operation, the processor 310 or some other controller causes data to be read from the nonvolatile recording medium into another memory, such as the memory 312, that allows for faster access to the information by the processor 310 than does the storage medium included in the data storage 318. The memory may be located in the data storage 318 or in the memory 312, however, the processor 310 manipulates the data within the memory, and then copies the data to the storage medium associated with the data storage 318 after processing is completed. A variety of components may manage data movement between the storage medium and other memory elements and examples are not limited to particular data management components. Further, examples are not limited to a particular memory system or data storage system.

Although the computer system 302 is shown by way of example as one type of computer system upon which various aspects and functions may be practiced, aspects and functions are not limited to being implemented on the computer system 302 as shown in FIG. 3. Various aspects and functions may be practiced on one or more computers having a different architectures or components than that shown in FIG. 3. For instance, the computer system 302 may include specially programmed, special-purpose hardware, such as an application-specific integrated circuit (ASIC) tailored to perform a particular operation disclosed herein. While another example may perform the same function using a grid of several general-purpose computing devices running MAC OS System X with Motorola PowerPC processors and several specialized computing devices running proprietary hardware and operating systems.

The computer system 302 may be a computer system including an operating system that manages at least a portion of the hardware elements included in the computer system 302. In some examples, a processor or controller, such as the processor 310, executes an operating system. Examples of a particular operating system that may be executed include a Windows-based operating system, such as, Windows NT, Windows 2000 (Windows ME), Windows XP, Windows Vista or Windows 7 operating systems, available from the Microsoft Corporation, a MAC OS System X operating system available from Apple Computer, one of many Linux-based operating system distributions, for example, the Enterprise Linux operating system available from Red Hat Inc., a Solaris operating system available from Sun Microsystems, or a UNIX operating systems available from various sources. Many other operating systems may be used, and examples are not limited to any particular operating system.

The processor 310 and operating system together define a computer platform for which application programs in high-level programming languages are written. These component applications may be executable, intermediate, bytecode or interpreted code which communicates over a communication network, for example, the Internet, using a communication protocol, for example, TCP/IP. Similarly, aspects may be implemented using an object-oriented programming language, such as .Net, SmallTalk, Java, C++, Ada, or C# (C-Sharp). Other object-oriented programming languages may also be used. Alternatively, functional, scripting, or logical programming languages may be used. Additionally, various aspects and functions may be implemented in a non-programmed environment, for example, documents created in HTML, XML or other format that, when viewed in a window of a browser program, can render aspects of a graphical-user interface or perform other functions. Further, various examples may be implemented as programmed or non-programmed elements, or any combination thereof. For example, a web page may be implemented using HTML while a data object called from within the web page may be written in C++. Thus, the examples are not limited to a specific programming language and any suitable programming language could be used. Accordingly, the functional components disclosed herein may include a wide variety of elements, e.g. specialized hardware, executable code, data structures or objects, that are configured to perform the functions described herein.

In some examples, the components disclosed herein may read parameters that affect the functions performed by the components. These parameters may be physically stored in any form of suitable memory including volatile memory (such as RAM) or nonvolatile memory (such as a magnetic hard drive). In addition, the parameters may be logically stored in a propriety data structure (such as a database or file defined by a user mode application) or in a commonly shared data structure (such as an application registry that is defined by an operating system). In addition, some examples provide for both system and user interfaces that allow external entities to modify the parameters and thereby configure the behavior of the components.

Automated Transcription Training System Processes

Figure 4:
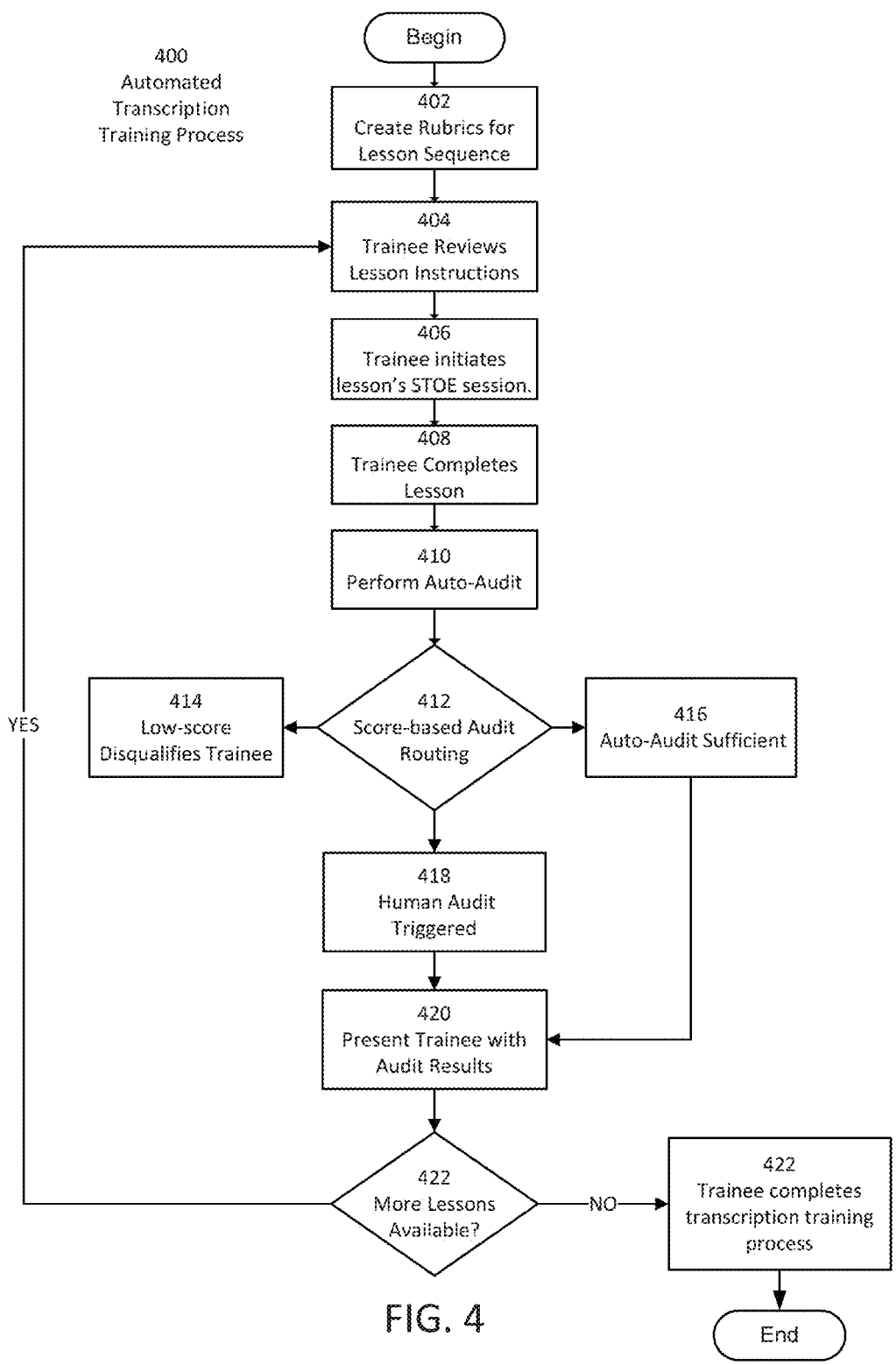
FIG. 4 is a flow diagram illustrating a process for executing a transcription training program.

Some embodiments perform processes that lead a trainee through a transcription training program using an automated transcription training system, such as the training system 100 described above. One example of such a process is illustrated in FIG. 4. According to this example, a process 400 includes acts of creating a rubric associated with a media file, instructing a trainee on how to use an associated electronic transcription editing tool, presenting lessons and exercises of transcription processes to a trainee, performing an automated audit of the trainee's transcription output, routing an automated audit to a human auditor as needed, and presenting audit feedback to a trainee.

In act 402, an Administrator interface 130 operating on a client computer 108 provides an Administrator 114 functionality to create or upload a set of rubrics for media files over a network 120 to the transcription training engine 132. The rubrics are stored in rubric table 208 and media files are stored in media file storage 136.

Figure 5:
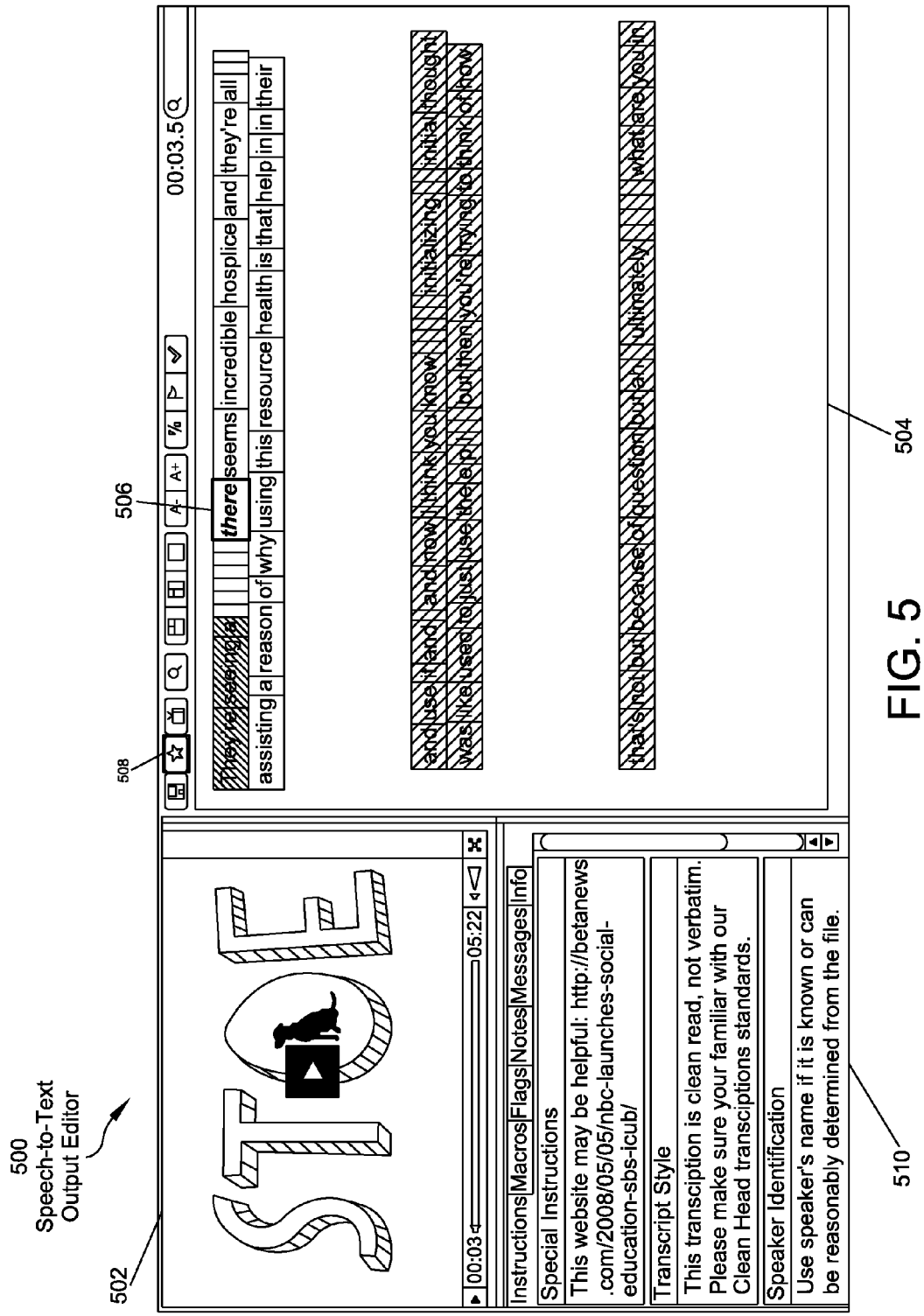
FIG. 5 is a depiction of a user interface for a speech-to-text output editor.

In act 404, a Trainee training interface 124 that is presented to a Trainee 110 on a client computer 104 over a network 116 to interact with the transcription training system 100 through a training management graphical user interface such the exemplary interface shown in FIG. 6. In some embodiments, the Trainee 110 is able to review instructions associated with a particular transcription lesson by clicking on either an Instructions link 602 providing text-based instructions or a video link 604. The instructions provided to the trainee provide guidance on the use of a transcription editing environment, of which an exemplary embodiment is shown in FIG. 5.

As one example of training lessons, a trainee may be instructed on the process of producing what may be referred to as intelligent captions for a media file. Intelligent captions in the context of electronic transcription processes are described in co-pending U.S. patent application Ser. No. 13/426,339, entitled "INTELLIGENT CAPTION SYSTEMS AND METHODS," ("the '339 Application") which is hereby incorporated by reference in its entirety. By instructing transcription trainees on the methods of producing intelligent captions, such as the intelligent captions produced by caption engine 132 in the '339 Application, trainees are able to master both the purpose of intelligent captions and the techniques required for their production. Upon market qualification for electronic transcription, newly qualified trainees have an understanding of the requirements for quality captions associated with an electronic media transcript. Having understood the contents of an associated captioning lesson, newly qualified trainees are able to improve the production of automated captions by reporting mistakes made the caption engine 132.

The specific qualities of an intelligent caption might include using various criteria in association with word-level time codes within a transcript, such as the begin_time_code and end_time_code values discussed above in relation to rubric tables, to create appropriate captions for a media file. Lessons for producing intelligent captions may focus on features that include creating captions framed at sensible textual grammatical unit boundaries that decrease the incidence of mid-phrase cutoffs, or framing captions that favor higher-level grammatical units. For example, a trainee may be instructed on applying rules that do not break captions between an article and the noun introduced by that article, a preposition and the object of the preposition, a possessive noun and the object possessed, nouns within a compound proper noun, or parts of a title. In some lessons, a trainee may be instructed on the appropriate means of breaking caption frames in the presence of various punctuation markings or paragraph boundaries. Other lessons may focus on the framing of captions at speaker transitions. Other lessons may focus on creating captions that are formatted in a textually balanced manner, both at a frame level and a line level where frames support two or more lines. Some lessons may focus on the creation of caption frames that are timed to improve readability of a video viewer. In such cases, tailoring the temporal presentation of words may not align exactly with the spoken words in a media file, but provide an end viewer with a better ability to understand the context of a speaker's statements.

As another example of a training lesson, a trainee may be instructed on the process of producing metadata associations for media file content. Metadata associations for media files in the context of electronic transcription processes are described in co-pending U.S. patent application Ser. No. 13/589,801, entitled "METHODS AND SYSTEMS OF ASSOCIATING METADATA WITH MEDIA," ("the '801 Application") which is hereby incorporated by reference in its entirety. Examples of metadata that might be associated with a media file include documents, news articles, advertisements, thumbnails, images, hyperlinks related to the current media file, hyperlinks pointing to other locations within the same media file, and other embedded textual content. By instructing transcription trainees on the methods of associating metadata with media files, trainees are able to appreciate the value of providing viewers of media files with a richer set of information than what may be possible through only watching a video or listening to a recording. Upon market qualification for electronic transcription, new qualified trainees have an understanding of how and where the association of metadata to a media file can add value to an organization presenting that media file, and also understand how to add that metadata within the most appropriate contexts in the media file.

As described in the '801 Application, an association engine 132, as shown in FIG. 1, provides functionality for creating individual metadata associations within electronic transcripts, building a library of metadata associations for a particular media file, and accessing elements from a metadata library for the creation of new annotations. Lessons for producing metadata associations may focus on features that include defining the location within a media file to which one intends to associate metadata, or using the graphical interfaces that provide access to existing elements within a metadata library. For example, in a media file containing a university lecture on eigenvalue computation within a linear algebra course, it may be beneficial to create within the video a hyperlink to a page in that course's online textbook discussing eigenvalues and eigenvectors. The transcription lesson using this example may guide the trainee through the user interface that allows for creating new metadata associated with a page from that online textbook, and then direct the trainee to the portion of the transcript editor interface that allows for associating the metadata with the correct location in the transcript. Some lessons may focus on aesthetic principles for presenting metadata to a user in a visually appealing manner that does not distract from the main message being presented in a media file.

In act 406, a Trainee training interface 124 provides functionality for initiating a speech-to-text editor (STOE) session that is presented to a Trainee 110 on a client computer 104, which will be used for both performing transcription and editing existing transcripts through a particular lesson.

In act 408, a Trainee training interface 124 provides functionality for a Trainee 110 to complete the transcription tasks associated with a particular exercise for a given lesson. In some embodiments, clicking an Exercise link 606 for a particular lesson, presents a speech-to-text output editor 500 to the trainee. In some embodiments of the editor interface, a media player window 502 is included that allows the trainee to watch or listen to a particular media file. While the media file is playing, the trainee performs transcription editing within a word editing window 504. In some embodiments, the word editing window is initially populated with text that was produced by an ASR Device 122 upon initial processing of the media file. In other embodiments, the word editing window may be populated with text that has been altered by an Administrator 114 in such a way as to teach a concept that is the focus of the current exercise. In other embodiments, the word-editing window may not be initially populated with any text at all, in which case an associated lesson focuses on teaching a trainee the process of performing a completely new transcription, instead of just editing an existing transcript.

In some embodiments, each word 506 within the word editing window 504 is separated into its own individual cell. As a Trainee 110 watches or listens to the associated media file, the trainee will decide whether to edit a word present in a particular cell that corresponds to the word spoken in the media file at that point in time. In embodiments, where no text has been provided, a presented lesson is structured to teach a complete transcription process in addition to transcription editing process. A Trainee 110 may obtain additional instructions or assistance through an instruction window 510 present within the speech-to-text output editor 500. In some embodiments, upon completion of the exercise, a Trainee 110 can press a "star" icon 508 to finalize the transcription job. In some embodiments, finalized time-coded transcription job is uploaded from a client computer 110 over a network 116 and stored in job data storage 134. In some embodiments, the time needed to complete the transcription job is also uploaded and stored in job data storage 134. In other embodiments, a transcript might be uploaded without time-codes. Upon submitting a finalized job for audit, the training management interface will update such that a Review state 508 is the currently active icon. When the transcription training system is in a review state, the trainee's output is pending the outcome of an audit, and the trainee cannot progress through the training program. In some embodiments, uploading a completed transcription job triggers an automated audit of the transcription to be performed by a transcription training engine 132.

Figure 12:
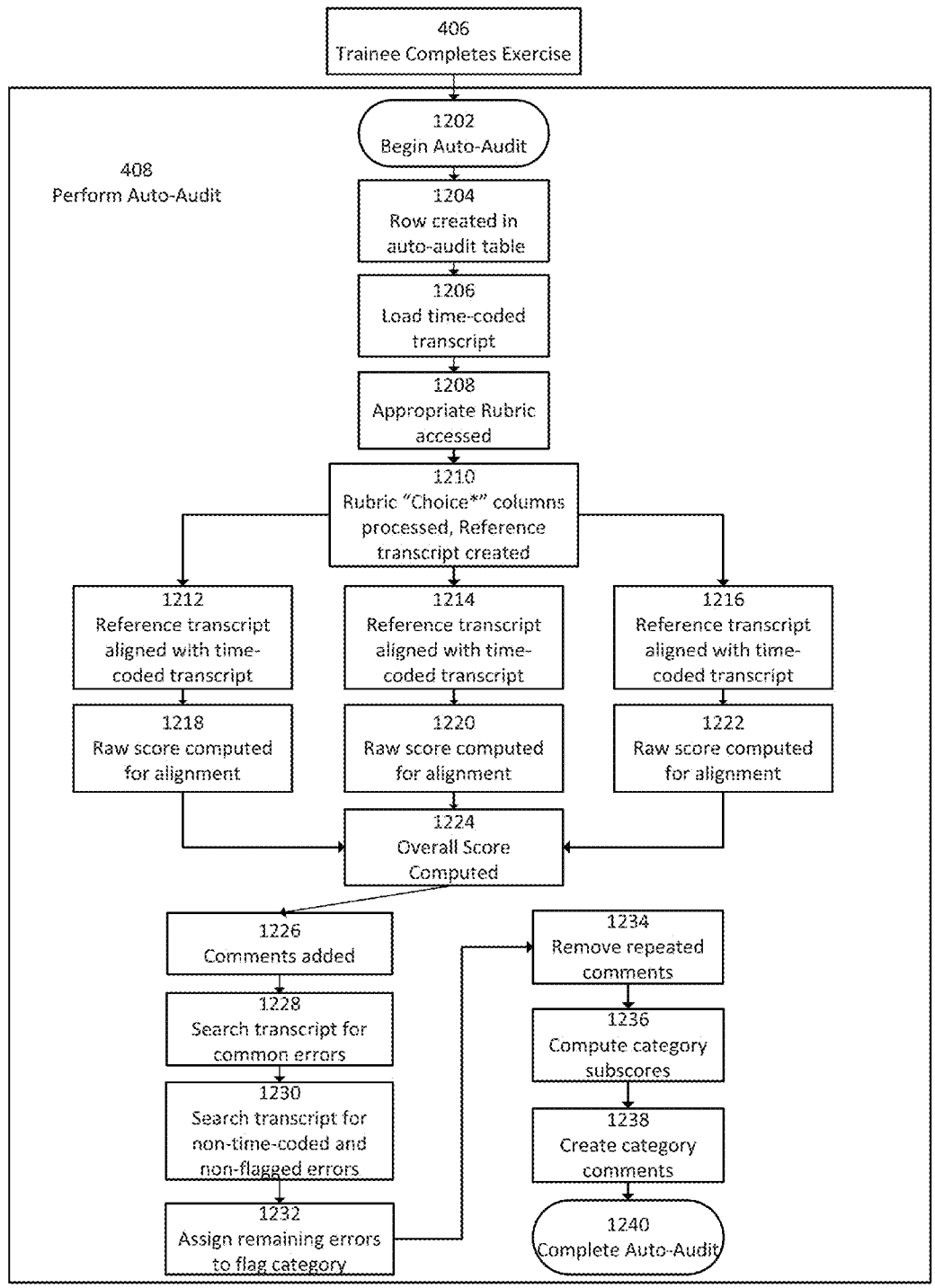
FIG. 12 is a flow diagram illustrating a process for performing an automated transcription audit.

In act 410, an automated audit is performed on the trainee's transcription output. An automated auditing process, as described in more detail below in association with FIG. 12, provides scores for various aspects of the trainee's performance as well as auto-generated commentary related to the trainee's performance.

In act 412, the training transcription engine 132 performs a score-based routing process for the transcription job based on the score assigned to the trainee by the automated audit. In some embodiments, a score that is below a particular passing threshold value will disqualify a trainee from proceeding in the transcription training program. In some embodiments, a score that is above an extraordinary threshold value will qualify a trainee to proceed to a later stage in the training process without the need for a human audit intervention, an "auto-pass" scenario. In some embodiments, a score that is at or between a passing threshold value and an to extraordinary threshold value will trigger a requirement that a human auditor 112 intervenes to perform a follow-up audit of the automated audit performed by the transcription training engine 132. In some embodiments, a human audit might be triggered by default, regardless of score, based on a setting provided to an administrator interface 130 by an administrator 114.

In some embodiments, the threshold value used for determining an "auto-pass" can be varied based on a trainee's performance history. As an example, the training system 100 might be configured such that each trainee receives at least some human auditor feedback for at least one lesson during the training lesson sequence. In this example, an auto-pass threshold value can be increased to an unattainable level in a scenario where a human auditor had not provided a trainee feedback for a defined number of consecutive lessons. As a specific instance of this example, a threshold value might be set to a value above the highest possible score if the last two lessons a trainee had completed were scored above the auto-pass threshold. In another example, a threshold value might be increased to a high level, but not a completely unattainable level, in a scenario where a human auditor had not provided a trainee feedback for a defined number of consecutive lessons.

In act 414, a trainee received a low score and is disqualified from the transcription training program. Appropriate messaging is retrieved by the transcription training engine 132 and is stored as part of the job record within job data storage 134 for later retrieval.

In act 416, a trainee received a high score that allows the trainee to proceed to a later stage of the transcription training program. In this case, the score received by a trainee was sufficiently above a passing threshold to allow for an auto-mated audit to be acceptable, and the trainee was not subject to any administrator defined requirements for a human audit to be performed regardless of score. Appropriate messaging is retrieved by the transcription training engine 132 and is stored as part of the job record within job data storage 134 for later retrieval.

In act 418, a trainee either received a score that was greater than a low disqualification scoring threshold and less than an extraordinary performance threshold, or was subject to an administrator requirement to receive a human audit regardless of their current score. In this case, the auto-audit performed in act 408 is required to be reviewed by a human auditor. The process of a human audit will be described in more detail below in association with FIG. 8.

Figure 7A:
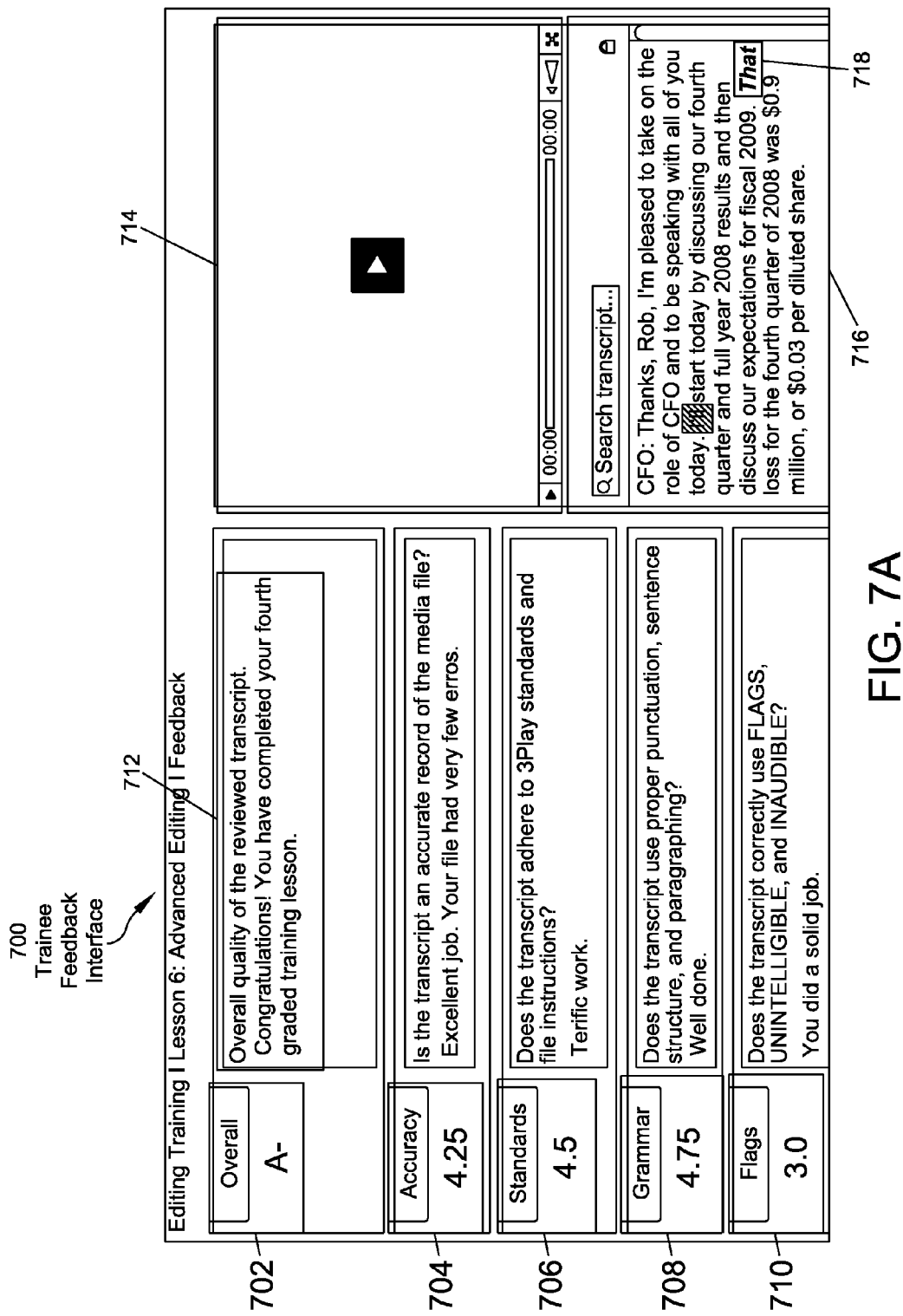
FIG. 7A is a depiction of a user interface for the feedback portion of a transcription training audit.

In act 420, a trainee is informed of the results of the audit process that was performed on the submitted transcription exercise. In some embodiments, the transcription training system 100 may inform a trainee 110 of the readiness of their audit results via an e-mail communication sent to the trainee's client computer 104. In some embodiments, upon logging to into the transcription training management interface 600 after the completion of the audit process, the trainee will be able to obtain feedback on their transcription performance by clicking a Feedback link 610 associated with the current lesson. In some embodiments, clicking a feedback link 610 launches a trainee feedback interface 700, as shown in FIG. 7A.

Trainee feedback interface 700 contains the results of the audit or audits that were performed on the trainee's output. Included within the trainee feedback interface, a trainee can see their overall grade 702 for the training exercise. In some embodiments, the grade presented to the trainee is converted from an overall score as described in more detail below. In some embodiments, a trainee feedback interface also presents category scores for accuracy 704, standards 706, grammar 708, and flags 710, and sync. In further embodiments, a trainee feedback interface also presents commentary 712 associated with each of the scores that are presented to the trainee. In some embodiments, the commentary 712 is generated automatically as part of the auto-auditing process 408 based on the appropriate category score, as described below in association with FIG. 12. In some embodiments, the commentary 712 for a particular category is entered by a human auditor during a human auditing process 416, as described below in association with FIG. 8.

In some embodiments, a trainee 110 may use a media player 714 embedded within the trainee feedback interface 700 to replay the media file associated with their completed lesson. In some embodiments, while replaying the media file, a trainee 110 may also follow along with a marked-up version of their transcript 716 that includes errors 718 that have been highlighted in a distinguishable manner from the main text. Some examples of highlighting errors might include using a different text colorization, underlining, strikethrough, change of font, and other potential means of highlighting text. In some embodiments both the error and possible suggestions for correction could be displayed together using various means of highlighting for an error and a suggestion. The corrected terms are synchronized with the media file via time codes contained within the rubric table 208.

Figure 7B:
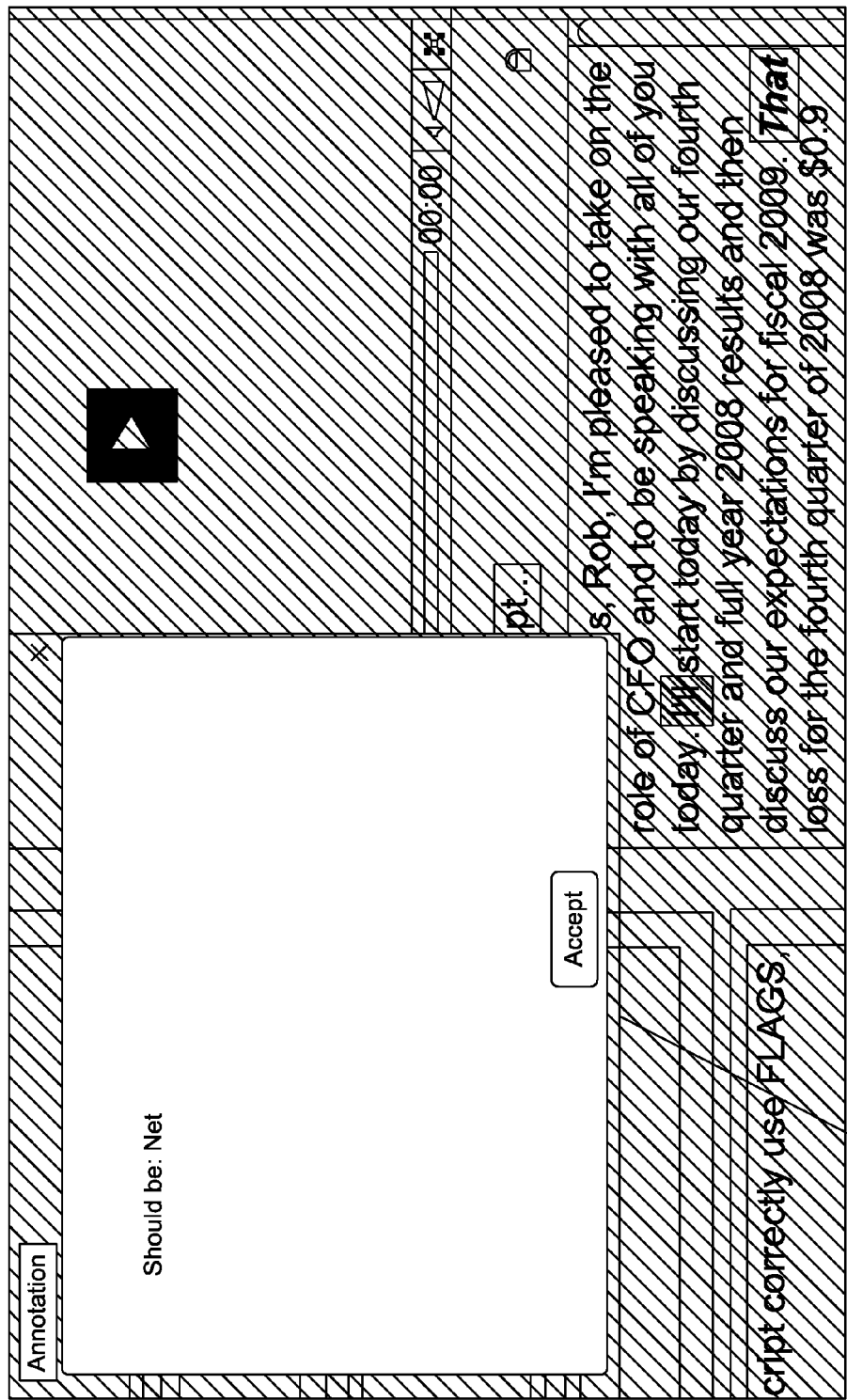
FIG. 7B is an illustration of a user interface for a pop up suggestion window associated with annotation of an incorrect transcription entry.

In some embodiments, when clicking on a highlighted error 718, an annotation window 720, as shown in FIG. 7B is displayed that contains the correct word as defined within the current rubric for the lesson. In the example annotation window 720 shown in FIG. 7B, the comment is an accuracy correction. Other examples may involve grammar, standards, or flags. For example, a grammar comment might discuss the correct use of punctuation. As another example, a standards comment might discuss appropriate formatting of numerical tokens. In a further example, a flag comment might provide an advisory to flag important words or phrases to for which the trainee might not know the correct spelling. Flags are often used for proper names. In some embodiments, a trainee must click the Accept button within the annotation window 720 to close the annotation window and confirm acknowledgement of understanding of its contents. In some embodiments, closing the annotation window 720 causes the associated error term to be corrected and color changed to match the main text in the transcript window 716.

In some embodiments, an annotation window includes indicators of transcript regions that are poorly synchronized. An example indicator might include a clock icon that is displayed in the margins near regions of poor synchronization. In some embodiments, a display indicator must be clicked for synchronization corrections to be accepted. In some embodiments, clicking on a display indicator associated with a synchronization error triggers a media file to be played back including the portion of poor synchronization from a trainee's transcript. In further embodiments, during playback of a media file in the temporal vicinity of a region of poor synchronization from a trainee's transcript, a highlight cursor tracks the transcript time-codes in the appropriate region. In this way, a trainee may visually observe a region of poor synchronization.

In further embodiments, clicking on a highlighted error 718 will not only open an annotation window 720, but will also launch the media file within the media player 714 within the time vicinity of when the corrected word is spoken. The mixture of textual, verbal, and video feedback allows the trainee to understand the full context of a correction.

In some embodiments, the trainee feedback interface 700 might also include elements allowing for the Trainee 110 to communicate with either the Administrator 114 or the Auditor 112. In some embodiments, if the Trainee 110 was subject to an automated audit, then questions or concerns related to the rubric would be directed to the training system Administrator. In other embodiments, if the Trainee 110 was subject to a human audit, the questions or concerns about specific feedback within an audit would be directed to the Auditor 112 that authored the feedback. As an example implementation, the annotation window 720 may include an additional "Comment" button that when pressed might present an additional comment feedback window into which the Trainee 110 could enter their commentary ("trainee comments") or concerns related to a particular error. In some embodiments, after a Trainee enters commentary, the client computer 104 sends information related to the comments, the audit ID, and the time-code over a network 116 to the transcription training engine 132 for storage within the job data storage 134. In some embodiments, several comments may be retained in a single data structure on the Trainee's computer 104 until the Trainee has completed the feedback session and that data structure is transferred in bulk at the close of the feedback session. Trainee communications received by the transcription training engine 132 and stored by the job data storage 134 might be used by an Administrator 114 to update rubrics associated with a particular lesson. For example, if several trainees communicate issues with a particular rubric entry, the Administrator 114 may modify the rubric to include their time-coded transcript corresponding to that entry as a valid choice column in the rubric table 208. In some embodiments, a process for updating rubrics could also be automated by setting a threshold for the number of communications received about a particular rubric entry. If the number of communications with identical errors exceeds this threshold, then an offline process would update the rubric to include this error mode as a valid Choice column.

In further embodiments, a Trainee 110 must click on all commented terms in the transcription window section 716 of the audit feedback interface 700 prior to having the ability to proceed to the next lesson.

In act 422, if more lessons are available, then the Trainee 110 can progress to the next lesson at step 404 for that lesson. Otherwise, if the Trainee 110 has completed all available lessons, then the Trainee proceeds to act 424 to complete the transcription training program.

Automated Auditing Process

Some embodiments perform automated processes that audit the performance of a trainee on a completed electronic transcription using an automated transcription training system, such as system 100 described above performed in act 408 described previously. One example of an automated auditing process is illustrated in FIG. 12. According to this example, a process 408 includes acts of receiving notification of a completed transcription, creating an audit record, loading a transcript, loading a rubric, evaluating a transcript in comparison with a rubric, annotating a transcript with corrections, and scoring a transcript.

In act 1202, the transcription training engine 132 receives notification from the trainee interface 124 of a transcription job that has been completed by the Trainee 110 and begins the auto-audit process.

In act 1204, a new row is created in the Audit Table 210 with the audit_id, trainee_user_id, edit_job_id, and lesson_id initialized appropriately. In some embodiments, the auditor_id is set to be that associated with the "3Play Automated Auditor."

In act 1206, in some embodiments a time-coded transcript is accessed from a file server to located on storage 308 in accordance with a file pointer in the Job Table 206 for the edit_job_id. In some embodiments, a file server from which a time-coded transcript is accessed may be located on a separate system accessed over a network 308. In further embodiments, an accessed time-coded transcript is loaded into memory 312 on a computer system 302 that is executing a transcription training engine 132.

In act 1208, an appropriate rubric for the media file that was transcribed by the Trainee 110 is accessed from the job data storage database 134. In some embodiments, access to the appropriate rubric is determined based on the value of the lesson_id assigned in the Audit Table 210 for this particular audit.

In act 1210, the choice columns in the rubric table from rows associated with a particular lesson_id are processed to produce a reference transcript as well as alternative transcripts. In some embodiments, a reference transcript may be parsed into the TRN format as supported by the SCLITE program that is part of the NIST Scoring Toolkit application for benchmarking automated speech recognition files from the National Institute for Standards and Technology. As example of the output from a parsing operation, a rubric fragment might be represented as:

{CFO/UNIDENTIFIED CO. REPRESENTATIVE} Thanks, Rob . . . fourth quarter and {full year/full-year} . . . approximately $6.8 million on Entries contained within brackets of a parsed rubric fragment are options for the words that can be used as part of a particular rubric.

In step 1212 a reference transcript is aligned with text from the time-coded transcript using a dynamic time-warping algorithm that minimizes a metric such as the Levenshtein distance that describes the minimum number of edits required to change one word sequence into another word sequence. In some embodiments, aligning a reference transcript with a time coded transcript is performed using an application such as the SCLITE program mentioned previously. An example output alignment may be similar to the contents of the following Table 1. Ellipses included within the rubric fragment above and table below indicate omissions of text from the fragment and rows from the table. The ellipses are included only for overall visual conciseness of this example, but are not indicative of full table contents.

TABLE 1

| Code | Reference | Transcript | Weight |
|---|---|---|---|
| = | CFO | CFO | 2 |
| = | Thanks, | Thanks, | 2 |
| ! | Rob. | Ralph. | 3 |
| ... | | | |
| ! | fourth | Q4 | 2 |
| < | quarter | < | 1 |
| = | and | and | 1 |
| = | full-year | full-year | 3 |
| ... | | | |
| = | approximately | approximately | 2 |
| ! | $6.8 | 6.8 | 8 |
| = | million | million | 5 |
| > | > | dollars | 8 |
| = | on | on | 2 |

In some embodiments, the "Code" column of an alignment output contains one of the symbols "=", "!", ">", or "<", where "=" means the trainee's transcript is correct, "!" means the trainee's transcript has a substitution error, ">" means the trainee's transcript has an insertion error, and "<" means the trainee's transcript has a deletion error. The Levenshtein algorithm minimizes the sum of substation errors, deletion errors, and insertion errors across the entire alignment. In some embodiments, the "Transcript" column contains the text from the trainee's time-coded transcript. A "Transcript" column will have one space-separated token per line, or else the "<" symbol if the "Code" entry for that line is also the "<" symbol. In some embodiments, the "Reference" column contains either the entry from one of a plurality of choice column entries contained in the rubric if any of them are correct in the alignment, the choice1 column entry if the code is the "!" symbol, or the ">" symbol if the "Code" entry for that line is also the ">" symbol. In some embodiments, if the "Code" entry for a row in the table is "=", then the "Weight" column entry for that row of the table is the importance element from the corresponding entry in the rubric table. In further embodiments, a particular entry in the "Weight" column is also taken from the importance entry in the corresponding rubric table if the error does not match any of the common_error regular expression entries for that region to of the transcript. In some embodiments, if a matching error is found for a particular region of the transcript, then the corresponding error_weight entry is used in the appropriate row of the "Weight" column.

In some embodiments, act 1212 is repeated, as represented by acts 1214 and 1216, using alternative reference transcripts taken from the presence of additional choice columns within a particular rubric table for the lesson.

Next, in act 1218, a raw score is computed for a completed alignment. As one example of computing a raw score, the transcription training engine first computes the number of lines in the alignment that do not include the ">" symbol in the corresponding code column, which is represented as NREF. Then, the process computes the number of errors, represented as NERR, as the count of lines that do not include the "=" symbol that is multiplied by the corresponding weight for each line. A raw score is then calculated as:

$$\text{raw\_score} = 1 - \text{NERR}/\text{NREF} \quad (1)$$

It is to be noted that in the event that a transcript has many insertion errors, a raw score value can be less than zero. In some embodiments, the raw score may be converted to an overall score using the following linear equation:

$$\text{Overall\_score} = \text{score\_offset} + (\text{scale} * \text{raw\_score}) \quad (2)$$

where the score_offset and scale are derived from a linear model that minimizes the mean squared error between the raw_score and the manually assigned overall score for a large training database of historical audits, as described below. In an some embodiments, the maximum value for the overall_score will be set to 18.0, such that in combination with the sync_score, the total_score will be capped at 21.0 in the same manner as in a human audit described below.

In some embodiments, alternative methods may be used for performing alignment and calculating raw scores may be performed. In some embodiments, punctuation may be ignored by the removal of punctuation from both the reference and the transcript. In another embodiment, paragraph boundaries may be considered as a special case of punctuation that are either ignored or given a lower weight than other alignment entries. In further embodiments, letter case may be made uniform throughout both the reference and the transcript so as to to ignore incorrect casing. In another embodiment, all of casing, punctuation, and paragraph boundaries may be ignored in both the reference and the transcript. In some embodiments, punctuation may be separated from the adjacent text, so that it is aligned separately. When punctuation is aligned separately, the weights on punctuation records may be either adjusted by a constant factor or by a separate constant for different types of punctuation. In some embodiments, all weights may be set equal in the scoring, effectively ignoring any weighting process. In some embodiments, time-codes may be used to mediate the alignment where word-to-word distances are based on the time occurrence of individual words in both the reference and the transcript. In some embodiments, the reference and the transcript may be split into a sequence of space-separated characters, so that a character-level alignment and score are computed.

Each of these variations for calculating scores will effectively highlight different aspects of the quality of a trainee's transcript. For example, the character-level alignment and scoring will tend to favor transcripts where small errors are made in accuracy, such as missing plural word forms or small name misspellings. In some embodiments, the substitution rates, the deletion rates, or the insertion rates may be treated separately to emphasize different aspects of transcript quality.

In some embodiments, act 1218 is repeated, as represented by acts 1220 and 1222 to perform scoring of a trainee's transcript evaluated for each separate alternative transcript corresponding to the separate choice columns present in the rubric table 208 for a current lesson. In a preferred embodiment, a plurality of alternative alignments and scoring methods are used to produce a plurality of raw scores. In some embodiments, the plurality of alignment and scoring processes may be performed in parallel on separate processes to increase overall computational throughput.

In act 1224, scoring operations are performed by combining all of the obtained raw scores using a model taking multiple inputs, such as an artificial neural network (ANN) model, for which an example construction is discussed in more detail in a later section below. In some embodiments, a utilized ANN model may be trained using a training database of historical electronic transcription sessions previously performed. In some embodiments, an ANN model may be trained by a standard training algorithm, such as a back propagation algorithm. The use of a back propagation algorithm allows for the training of a model that predicts human audit scores with minimal distortion. In some embodiments, the output of the ANN may be configured to ensure that it outputs a value between 0 and 18. In some embodiments, the value to returned from the ANN model is stored in both the score_overall and original_score_overall fields of the record in the Audit Table 210.

In some embodiments, a synchronization score is computed using the ideal time codes stored within a rubric and the actual time codes from a time-coded transcript. In a preferred embodiment, a version of the alignment is used that ignores casing and punctuation errors when calculating a synchronization score. In a preferred embodiment, synchronization will be best measured over sections that have either a "=" or "!" code in the Code field of the alignment table for the current alignment. In some embodiments, synchronization will be measured using only the sections that have a "=" code in the Code field for the alignment table for the current alignment. In a preferred embodiment, time codes for a reference transcript are taken directly from the rubric rows that correspond to the Reference column value for that alignment and the transcript time codes are taken from the elements of the time-coded transcript with correspond to the Transcript column for that alignment. In some embodiments, if a rubric contains multiple tokens in a particular record, when an alignment is defined as having only one token element per record, the Reference time codes may be interpolated from the rubric. Interpolation from the rubric involves dividing the time region of interest evenly among the space-separated tokens. In preferred embodiments, each entry in a Reference record will have beginning and ending time codes labeled "ref_beg" and "ref_end." Similarly, each entry in a trainee's Transcript will have beginning and ending time codes labeled "trans_beg" and "trans_end."

In some embodiments, the defined time codes are used as input to a sequence of operations for calculating a synchronization score. In a preferred embodiment, duration values, "ref_dur", for reference transcript entries are calculated as follows:

$$ref\_dur = ref\_end - ref\_beg \quad (3)$$

In a preferred embodiment, duration values, "trans_dur", for trainee transcript entries are calculated as follows:

$$trans\_dur = trans\_end - trans\_beg \quad (4)$$

In a preferred embodiment, the following logic is utilized for calculating per-record overlap:
if ((ref_beg==trans_beg) && (ref_end==trans_end)) {
    overlap=1.0;
}
elsif ((trans_end<=ref_beg)||(trans_beg>=ref_end)) {
    overlap=0.0;
}
elsif ((trans_beg<ref_beg) && (trans_end>ref_end)) {
    overlap=refdur/transdur;
}
elsif ((trans_beg>ref_beg) && (trans_end<ref_end)) {
    overlap=trans_dur/ref_dur;
}
elsif (trans_beg<=ref_beg) {
    overlap=(trans_end−ref_beg)/ref_dur;
}
elsif (trans_end>=ref_end) {
    overlap=(ref_end−trans_beg)/ref_dur;
}

In preferred embodiments, a total overlap is computed as the weighted average of per record overlaps, as weighted by the corresponding value of "ref_dur" for each record. In some embodiments, a total overlap is computed as the mean of per record overlaps. In preferred embodiments, the total overlap has a value between 0.0 and 1.0. In some embodiments, any overlap between a reference record entry and a transcript record entry is considered perfect overlap having an overlap value of 1.0. In some embodiments, each time-coded rubric entry has a time-code weight assigned, such time-coded weights emphasizing regions of a media file in which synchronization is deemed more or less important than other regions. As an example, synchronization is generally more important at times when speakers change, than during the middle of a portion where only a single individual is speaking. Time-coded weights are distinct from both importance and error_weight in the rubric table. In some embodiments, these time-coded weights are applied when performing weighted averaging operations discussed previously.

In some embodiments, a synchronization score is calculated as a linear transformation of the total overlap. An example calculation of a synchronization score is shown in the following equation:

$$sync\_score = max(0, min(3.0, ((overlap - 0.75) * 20))) \quad (5)$$

In the above example, the synchronization score is bounded within the inclusive interval of 0.0 to 3.0. In some embodiments, this synchronization score value is stored within both the sync_score and original_sync_score fields within the appropriate record in an Audit Table 210. In further embodiments, a total score for the audit is calculated by summing the overall_score and the sync_score from the current audit's record in the Audit Table 210.

In some embodiments, an annotation data structure is appended with a list of poorly synchronized time regions. In some embodiments, these poorly synchronized time regions are defined as those regions in a trainee's transcript where a certain number of sequential entries of that transcript have poor overlap as determined by the above per record calculations compared to a preset threshold value. This list of poorly synchronized time regions may be used in the trainee feedback interface as described above in relation to synchronization display indicators.

In act 1226, a total score, a lesson_id, and a threshold value used for automatically passing a trainee are consulted in order to determine the appropriate types of comments to append to the audit record. In some embodiments, general comments are added to the "Comments" data structure in the audit record in an automated manner. In some embodiments, the general comments that may be utilized are stored in a lookup table with appropriate comments corresponding to various values. As one example, if a trainee's standards sub-score is greater than 4.5 for lesson 3, the accuracy comment may be looked up and stored as, "Terrific work. You have a strong grasp of the standards tested in this file. Continue to study the Standards Guide and file instructions to stay on top of various standards that will be tested going forward." In another example, if the accuracy sub-score for a particular lesson is between 2.5 and 4.1, the comment retrieved may be, "You had a few accuracy issues. Depending on your errors, it may be a good idea to use or purchase high quality headphones to be sure you can hear faint audio."

In act 1228, a trainee's output transcript is searched for the regular expressions contained within the plurality of common_error columns within a rubric. In some embodiments, the range of searching for these errors may be limited to an associated position within a rubric. In some embodiments, the range of searching for errors associated with these regular expressions may take into account adjustments for insertions and deletions, as indicated by an alignment with a Reference transcript created from a rubric. Adjustments based on insertions and deletions are performed for efficiency purposes, as it is rare for an error regular expression to occur at random locations throughout a transcript away from the target location in the rubric. In some embodiments, as each error is found in association with entries from the common_errors column of a rubric, the annotation data structure is appended with the following information: a beginning time code of the first matching transcript element, an ending time code of the last matching transcript element, an error type, an error weight, an error comment.

In act 1230, a trainee's output transcript is then searched for all errors in the alignment not already covered by the time codes in the annotation data structure, as well as errors that do not involve a flagged element in the transcript. In some embodiments, errors associate with flagged elements are indicated by a "[?<text>?]" convention. In some embodiments, these types of errors are assigned to the "accuracy" error type sub-category. In some embodiments, a comment is entered into the audit record associated with an accuracy error that is constructed dynamically from a corresponding reference token. An example of such a comment might be, "'Q4' should be transcribed as 'fourth quarter'." In some embodiments, the weights, beginning time codes, and ending time codes are derived from the alignment in the same manner as for common_error entries described above.

In act 1232, all remaining errors in an alignment that are not already included in an annotation data structure are assigned to the "flag" category. In some embodiments, errors assigned to the flag category are associated with a comment that is dynamically constructed from the corresponding flagged text in the trainee's transcript and text in the reference transcript. An example of comment construction for flagged text may be such that if some flagged <text> is the same between the trainee's transcript and the reference, the flag is listed as OK. In another example, if the rubric indicates that a flag is allowable at that point, the comment associated with the flagged text should be taken from the associated location in the rubric, with the flag also listed as OK. In another example, the comment associated with flagged text should just be taken from the corresponding location in the rubric. In some embodiments, if a flag is marked as OK, the weight value associated with entries in an annotations data structure should be set to zero. In some embodiments, the weight associated with entries in an annotations data structure should correspond to the weight listed in the rubric.

In some embodiments, if a rubric contains "complement" annotations, being those annotations associated with valid Choice column entries, the alignment is searched for regular expressions associated with these comments. In some embodiments, the range of search for each of these regular expressions in the trainee's transcript may be limited to an associated position in the rubric, with adjustments for insertions and deletions as indicated by the alignment. In some embodiments, as each complement is found, the annotation data structure is appended with the following information: a beginning time code of the first matching transcript element, an ending time code of the last matching transcript element, the type "complement", the importance value, the associated comment.

In some embodiments, all operations of inserting a flag may result in a constructing a complement annotation. In one example, for early training sessions that have not yet covered the concept of flagging unclear terms, it may be desirable to always construct a complement annotation in association with a flag, even if the text item being flagged is incorrect. In this example, all flagged items would be deemed "correct", and a dynamic comment would be constructed. An example dynamic comment associated with flagging text in a trainee transcript that is the same as a reference might include, "Congratulations for jumping ahead in your training! The flagged item '<text>' is actually correct, but flagging unclear items is a good idea." A further example associated with flagging text that is not the same as what is present in the reference might include a comment such as, "Congratulations for jumping ahead in your training! The flagged item '<text>' should be '<reference>', but flagging unclear items is a good idea."

In act 1234, a final pass is made through the annotations data structure to identify any repeated comments. For example, a trainee may repeat the mistake of including both "$" and the word "dollars", in which case the annotations data structure will include multiple copies of a comment such as, "The dollar sign is another way of writing the word 'dollars'. You should delete the word in the case." In some embodiments, during the final pass through the annotations data structure, the first occurrence of a comment is not modified. In some embodiments, a second occurrence of a same comment in the annotations data structure is appended with the sentence, "This applies throughout the file." In a preferred embodiment, the error_weight is reduced to 1 for subsequent occurrences of a same comment. In some embodiments, subsequent occurrences of a same comment are removed from the annotations data structure. In this way, a trainee will not be penalized excessively for misunderstanding the same lesson concept. This type of dynamic logic is similar to that used by a human auditor when confronted with consistent error modes such as the one described above. In some embodiments, completion of the final pass of the annotations data structure triggers the saving of the annotations data structure into the audit table record.

In act 1236, category sub-scores are computed using the processed annotations data structure. In some embodiments, a total score deduction is computed as the difference between the maximum overall score and the actual overall score computed through the use of an ANN. In some embodiments, for each of the overall, accuracy, standards, grammar, and flags subcategories, the annotations data structure is searched for error entries related to the particular category. In some embodiments, the weights for errors for a particular category are summed to produce a category penalty. In some embodiments, a category penalty for a particular category is scaled by the corresponding maximum category score. In one example, the scaling for categories might be the following: Accuracy=5.0, Grammar=5.0, Standards=5.0, Flags=3.0. In some embodiments, the four scaled category penalties are summed to produce a total error penalty. In some embodiments, each scaled category penalty is divided by the total error penalty to arrive at the category's contribution to the total score deduction. In further embodiments, each contribution is then subtracted from the corresponding maximum category score to arrive at the category sub-score. In some embodiments, the resulting category sub-scores are saved into their appropriately corresponding fields within the audit table record.

In act 1238, category comments are created for each sub-category through the use of a lookup table that is indexed based on the appropriate score for each sub-category. In some embodiments, comments found within a lookup table are added to a Comments data structure within the audit record. As one example, if a trainee's accuracy sub-score is greater than 4.5 for lesson 3, the accuracy comment may be looked up and stored as, "Excellent job! Your first STOE exercise had very few errors." In another example, if the grammar sub-score for a particular lesson is between 2.5 and 4.1, the comment retrieved may be, "You had some difficulties with common grammatical principles in this file. Please review the following link to help you hone in on proper comma usage: http://www.grammarbook.com/punctuation/commas.asp."

In act 1240, the automated audit is completed and is finalized by saving the audit record within the Audit Table 210.

Artificial Neural Network Scoring Model

As mentioned above, in some embodiments of the automated auditing process, an artificial neural network (ANN) is utilized for calculating the overall score. In some embodiments, an ANN combines a plurality of alignment scores that were computed by to different methods with a goal of modeling the score that a human auditor would give to that same trainee transcript. The construction of an ANN follows a procedure that is familiar to someone of skill in the art. In some embodiments, for each record in the audit table, an historical human audit score (the Score Overall) is used as the desired output of the network. In some embodiments, the plurality of alignments scores, as computed from the rubric and time-coded transcript associated with an audit, are used as the inputs to the ANN. In some embodiments, the ANN weights are adjusted using a training algorithm, such as the back propagation algorithm. Training is performed to minimize the total distortion, or mean-squared error, between the ANN output and the desired output across all records in the audit table. In a robust training methodology, a subset of the audit table is used as the training set. The ANN produced as a result of the training algorithm is periodically validated against a held-out validation subset. The training iterations stop when the distortion on the validation subset stops or decreases less than a given threshold.

In some embodiments, other optimizations of this training methodology may be utilized. In some embodiments, the training or validation subsets may be further subset to include only audits from human auditors who are known to be most reliable. In some embodiments, separate models may be built for each training lesson in a plurality of lessons. In some embodiments, the same model may be used for only sets of lessons based on the resulting distortion metric from the training subset or evaluation subset. In some embodiments, models for different lessons may use different input feature sets, where those feature sets include subsets of alignment and scoring methods as described previously.

In some embodiments, as more manual audits are performed, the model build process is repeated to incorporate the additional data. In further embodiments, some audits that normally would be immediately directed to a trainee for feedback, based on an above threshold score obtained by the trainee, may be diverted at random to a human auditor. Diverting random audits to a human auditor ensures that model updates are not skewed toward modeling only low-scoring lessons. In some embodiments, when rubrics are modified, the ANN model building process is repeated to reflect a rubric's current state. As modeling building processes are offline from the operation of the main portion of the transcription training system 100, the updating of an ANN does not interfere with normal operation of the training system.

In some embodiments, the resulting models are stored on a file server with a database table referencing the appropriate model associated with a lesson_id. In some embodiments, the ANN scoring of trainee transcript as part of an automated audit accesses the appropriate model to from the database by lesson_id, stores the model in memory and utilizes that model to perform the scoring.

In some embodiments, the same methodology used for storing and accessing ANN models may also be utilized for storing and accessing simpler scoring models. For example, lesson specific values for score_offset and scale maybe stored as part of a linear scoring model.

Human Auditing Process

Figure 8:
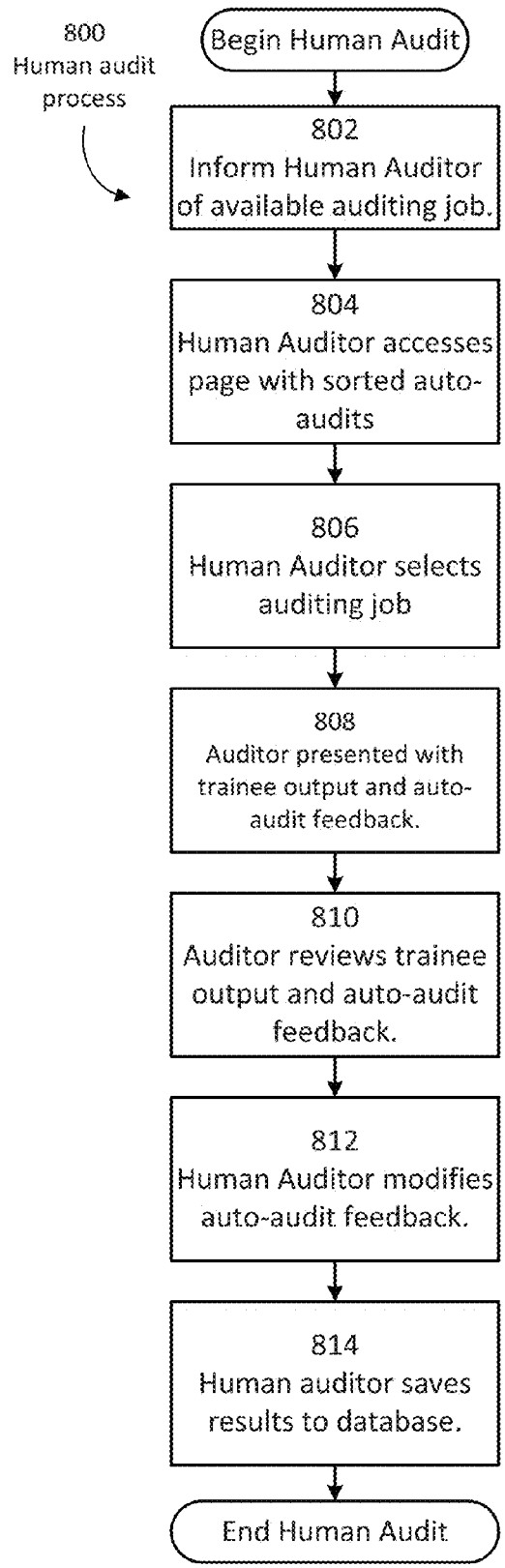
FIG. 8 is a flow diagram illustrating a process for performing a human transcription audit.

Based on the scores obtained by a trainee within the course of an automated audit, some embodiments require that human auditors interact with the automated transcription training system, such as system 100 described above, to perform a follow-up manual auditing procedure in act 416 mentioned previously. In this case, a trainee's audit score as determined by the auto-auditing process was above a level that would be deemed a failure, but below a threshold that would allow for the trainee to proceed immediately to the next step in their training lessons. One example of a human auditing process is illustrated in FIG. 8. According to this example, a process 800 includes acts of communicating to a human auditor the existence of a transcription job to be audited, providing a human auditor access to an audit management interface, providing a human auditor access to a transcription job to be audited manually, providing access to the automated audit output associated with a transcription job, providing interfaces for a human auditor to adjust the feedback results of an automated audit, and providing interfaces for a human auditor to save the results of a manual audit.

In act 410, a score based routing system triggers the need for a human audit by performing act 802 to communicate the availability of a job that is ready for human auditing. Examples of communicating the availability of a job ready for human audit might include sending an e-mail to a human auditor's e-mail account or posting the availability of a job to an electronic transcription job market.

In act 804, the system provides an interface with functionality such that a human auditor with appropriate access privileges can access an auditor market page that lists available auditing jobs. An example audit market page is shown in FIG. 9. In some embodiments, the jobs available within an auditor market page 900 have all been previously audited in an automated manner by the automated transcription training system. In some embodiments, the audits may be sorted in order of overall score, as shown in the AUTOSCORE column 902, such that those trainees with the highest evident skill can have their transcripts manually to audited sooner. In some embodiments, sorting may be based on other aspects of trainee performance including: average score over all training lessons, trainee editing efficiency, previously observed time delay for trainee access of the audit feedback user interface, current training stage for all trainees. By having a variety of sorting metrics, a training audit job market can be optimized to market qualify trainees that are likely to be able to edit actual customer jobs with quality and efficiency. In the example of FIG. 9, only audit scores of less than 20.50 are shown in the current human auditor's market page. In this example, an auto-pass threshold was set to be 20.50. In this example, any trainee that received an automated audit score of 20.50 or greater would have received feedback directly from the automated audit and would be able to advance to the next lesson without human auditor intervention. As mentioned above, in FIG. 9 the AUTOSCORE column 902 is sort column showing the human auditor which audits to review first. In some embodiments, audits greater than a particular value will be appended with a flag icon as shown in a PRIORITY column 904. Audits that are flagged as PRIORITY are the most likely to be situations where the trainee is an excellent candidate for becoming market qualified in production. In these cases, expedited auditing and delivery of feedback is most important.

In some embodiments, the payrate 906 offered to a human auditor could be adjusted to incentivize auditors to claim jobs with higher scores. In some embodiments, this rate could be incrementally increased for these high-scoring audits as those jobs sit longer on the market. Further examples of the operation of an electronic transcription job market are discussed in 'the 123 application' referenced previously.

In act 806, the system presents human auditor with interface providing functionality for selecting a job to audit.

Figure 10:
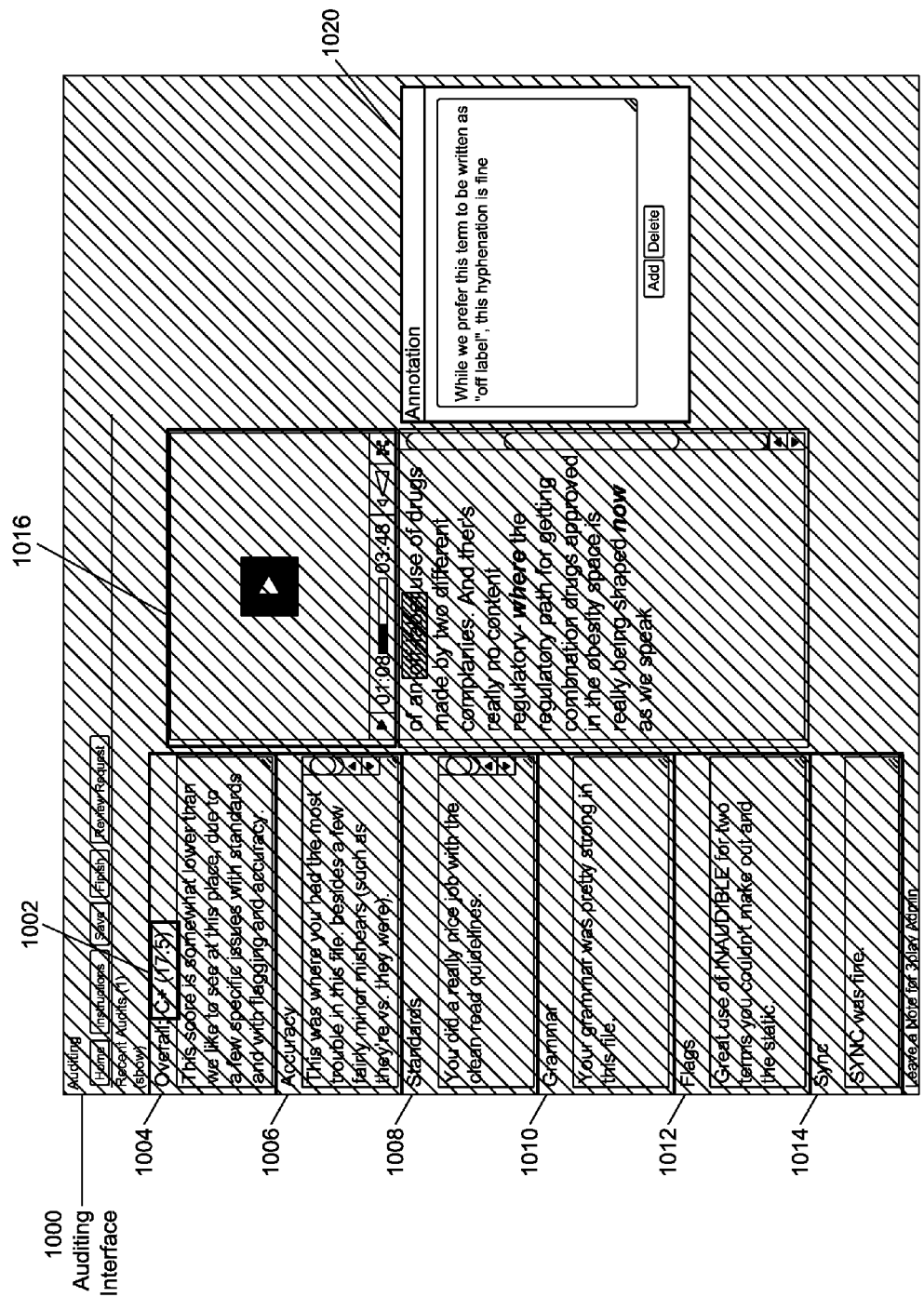
FIG. 10 is an illustration of a user interface for the auditing portion of a transcription training procedure as provided by an auditor interface.

In act 808, the system presents the auditor with a feedback interface containing the results of the automated audit, such as the interface shown in FIG. 10. In some embodiments, the auditing interface 1000 consists of sections displaying a trainee's various overall and category scores, as well as the feedback for each category provided by the previously completed automated audit. In the example of FIG. 10, the trainee's overall score 1002 is presented adjacent to overall feedback 1004. In some embodiments, sections for feedback related to other subcategories of accuracy 1006, standards 1008, grammar 1010, flags 1012, and sync 1014 are presented as well.

In act 810, the human auditor reviews the trainee's transcript as well as the results of to the automated feedback process. In some embodiments, the auditing feedback interface includes a media player 1016 that allows for playback of the media file that was transcribed by the trainee. In further embodiments, a transcript window 1018 is included within the auditing feedback interface. In some embodiments, the transcript window is populated with a marked version of the trainee's transcript that highlights errors as well as flags set by the trainee in the process of performing the transcription.

In act 812, the system provides the human auditor with functionality to modify the automated audit feedback that is presented. In some embodiments, each of the categories containing auto-generated feedback are editable by the auditor. In some embodiments, the system provides the human auditor functionality to modify the overall score assigned to the trainee by the prior auto-auditing process. In further embodiments, the system provides the human auditor functionality to modify any of the transcript corrections that were inserted by the auto-auditing process. In some embodiments, the system provides the human auditor functionality to click on a correction that was inserted by the auto-auditing process in order to display an annotation window. In further embodiments, the system provides the human auditor functionality to modify any of the comments displayed in the annotation window that were previously assigned. In some embodiments, the system provides the human auditor functionality to add comments to a transcript that are not corrections. For example, an auditor may add annotations that are complements for transcript items related to areas where the trainee has performed exceptionally well. Some examples may include indications that the trainee has learned techniques for utilizing the speech-to-text editor (STOE) interface that have not yet been explicitly presented in the lessons.

In a preferred embodiment, the system limits the category sub-scores that are assignable by a human auditor. An example of the limits place on the Accuracy, Standards, and Grammar sub-scores are between 0 and 5 by increments of 0.25. An example of limits placed on the Flags and Sync sub-scores are between 0 and 3 by increments of 0.25. In some embodiments, the overall score is computed from the sum of all category sub-scores. In the above examples, the overall score is limited to be between 0 and 21 and can have increments of 0.25. In some embodiments, a letter grade will appear adjacent to the overall score 1002. In some embodiments, assignment of a letter grade is based on a pre-defined grading scale. An example of such a grading scale conversion chart is shown in the logic below:

case
   when score>=20.5 then 'A+'
   when score>=20.0 then 'A'
   when score>=19.5 then 'A−'
   when score>=19.0 then 'B+'
   when score>=18.5 then 'B'
   when score>=18.0 then 'B−'
   when score>=17.5 then 'C+'
   when score>=17.0 then 'C'
   when score>=16.5 then 'C−'
   when score>=16.0 then 'D+'
   when score>=15.5 then 'D'
   when score>=15.0 then 'D−'
   else 'F'
end In some embodiments, an overall score may be displayed without a corresponding letter grade.

In act 812, the system provides the human auditor with functionality to save the results of the manual audit to the appropriate record in the Audit Table 210, which completes the human audit process.

Tracking Editing Efficiency and Overall Progress

As mentioned previously, time spent performing a transcription is one element on which trainees are measured when performing an electronic transcription. In some embodiments, the time needed to complete the transcript process is stored in the job table 206 within job data storage 134. In some embodiments, by collecting data concerning the transcription times performed by numerous trainees, the transcription training engine 132 can perform statistical computations on this data. Examples of statistical computations that might be performed include operations such as the mean, standard deviation, median and other similar statistical measures.

Figure 13:
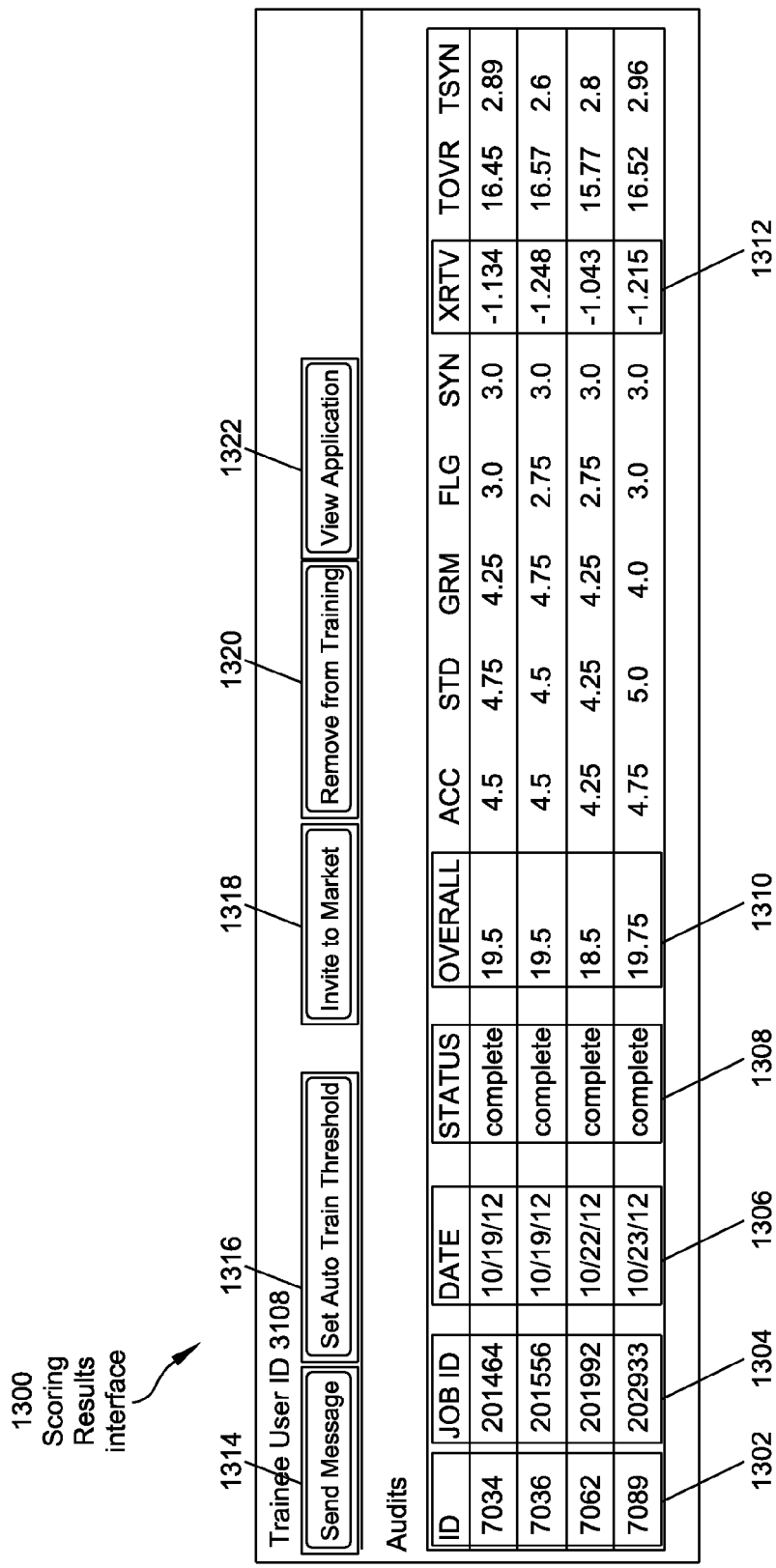
FIG. 13 is a depiction of a user interface for a scoring result summary as provided by an administrator interface.

In some embodiments, when a trainee completes a training lesson, the time necessary for completion may be used in manners including: presenting the trainee's performance on a graphical bell curve comparing that trainee to all trainees having taken that lesson, presenting the trainee's performance to an auditor or administrator along with summary statistics for all trainees at various stages in the training program, determining if a trainee should receive to human feedback despite exceptionally high scores that would otherwise merit an auto-pass situation. An example interface that might be displayed to a human auditor or audit administrator is shown in FIG. 13. In the example shown, audit results are presented for first four training lessons. Standard job criteria are displayed such as the audit_id 1302, edit_job_id 1304, date of job completion 1306, state of the audit 1306, and overall score 1310. In some embodiments, one important metric displayed to the auditor or audit administrator is the XRTV column 1312 that represent the "times real time variance." The XRTV is a measure of the time a trainee needed to complete the transcription divided by the media file duration. The XRTV is a generally a more stable measure of editing efficiency than is the raw editing time. The XRTV can be computed as follows:

$$XRTV = (Lesson\_Measured\_Times\_Real\_Time - Mean\_Lesson\_Times\_Real\_Time)/Lesson\_Standard\_Deviation \quad (6)$$

In the example shown in FIG. 13, the trainee is consistently more than one standard deviation faster than the lesson mean. In combination with the trainee's excellent overall scores, having exceeded the auto-pass threshold of 19.25 for the first, second and fourth lessons, this trainee will likely be extremely productive and accurate once market qualified.

In general, using these techniques, audit administrators, auditors and trainees can be made aware of the efficiency dimension of the STOE editing process, and not just be focused on the quality aspects of the process. Efficiency greatly affects the ability to meet customer deadlines, as well as the trainees' willingness to continue working in the system after market qualification is achieved. Consequently, in some embodiments, efficiency may be used as an additional filter during the training process. In some embodiments, trainees that are extremely inefficient might be removed from the onboarding process. An example reason for removal might include a trainee whose XRTV exceeds 2.0 placing that trainee in the $1^{st}$ percentile in efficiency. In some embodiments, the XRTV value could also be combined with an existing audit score as a means of filtering trainees that require human feedback.

In some embodiments, an example results interface, such as the graphical interface shown in FIG. 13, provides functionality for an auditor or administrator to performing various operations related to the state of particular trainee or a group of trainees in the training program. Using functionality provided by a "Send Message" button 1314, an administrator or auditor can contact a trainee directly via electronic communication methods potentially including e-mail, instant messaging, SMS text messaging, posting to a message board within to the training program, or other potential methods of communication. Using functionality provided by a "Set Auto Train Threshold" button 1316, an auditor or administrator can set the auto-passing thresholds discussed previously that determine how or if a trainee can progress through the training program with or without the need for human auditing. Using functionality provided by the "Invite to Market" button 1318, an administrator can invite a trainee to become a market qualified transcription editor. In some embodiments, the system provides an administrator access to the "Invite to Market" functionality to short circuit a particular trainee's training program, providing an early market qualification to the trainee. In a preferred embodiment, the system provides an administrator access to the "Invite to Market" functionality upon a trainee completing the transcription training program. Using functionality provided by a "Remove from Training" button 1320, an administrator can remove a particular trainee from the training program. Using functionality provided by a "View Application" button, an auditor or administrator can view the electronic application that a trainee submitted when applying for acceptance into the training program. As an example of use for the "View Application" functionality, an administrator might need to view information such as the number of hours-per-week that a trainee is available, the trainee's geographic location, and other demographic or prior experience information that might impact a decision on whether to continue association with a trainee or inviting that trainee to participate in a transcription market.

In some embodiments, the scoring results interface 1300 may provide functionality for an audit administrator to ensure that a trainee's next lesson is audited by a human, regardless of the subsequent score produced by an automated audit. In some embodiments, the scoring results interface 1300 may provide functionality for an audit administrator to ensure that the trainee's next training lesson is not reviewed by a human auditor, regardless of the subsequent score produced by an automated audit.

As an example of results obtained from the process of training transcription editors using an automated transcription training process, FIG. 14A displays data representative of the results from a transcription training system, such as training system 100, that was utilized in training actual transcription editors. The top shaded rows, containing months April-June, are results from operation of the training system prior to inclusion of an automated auditing process, where only human audits take place. The bottom non-shaded rows, containing months August-January, are results from operation of the training system after inclusion of an to automated auditing process. FIG. 14B displays summaries of the data from FIG. 14A that show a variety of valuable results. As a result of adding the automated auditing process, there was an increase in the completion percentage rates for trainees entering the transcription training program, a decrease in the average time needed for each trainee to complete the training program, a decrease in the average number of human audits performed for each trainee, and a significant decrease in the cost per editor. The cost per editor is the cost per trainee that graduates to being market qualified, as opposed to the cost per trainee for all trainees in the system.

For the same data set used in creating the tables in FIG. 14, further analysis showed that the attrition rates of trainees dropped from 23% before the implementation of an automated auditing system to 2.8% after the implementation of the automated auditing system. Also the average audit scores of market qualified trainees rose from 18.86 before implementation of the automated auditing system to 19.30 after implementation of the automated auditing system, which suggests that the addition of the automated auditing system may improve the quality of transcription editors that are graduated from the training program.

Having thus described several aspects of at least one example, it is to be appreciated that various alterations, modifications, and improvements will readily occur to those skilled in the art. For instance, examples disclosed herein may also be used in other contexts. Such alterations, modifications, and improvements are intended to be part of this disclosure, and are intended to be within the scope of the examples discussed herein. Accordingly, the foregoing description and drawings are by way of example only.

What is claimed is:

1. A system for training transcription system trainees to edit computer generated transcription information, the system comprising a server computer including:
   a network interface configured to exchange information with a first client computer and a second client computer;
   a memory storing the transcription information and at least one media file received from the first client computer via the network interface, the at least one media file including audio or audiovisual information;
   at least one processor coupled to the memory and the network interface;
   an automatic speech recognition component executable by the at least one processor and configured to generate the transcription information from the at least one media file and to store the transcription information in the memory;
   a trainee interface executable by the at least one processor and configured to:
      a) provide a graphical user interface via the second client computer, the graphical user interface being configured to display, on the second client computer, the transcription information and the at least one media file to at least one transcription system trainee and to receive information descriptive of one or more interactions between the second client computer and the at least one transcription system trainee, the interactions being based on the transcription information and the at least one media file as displayed by the graphical user interface;
      b) receive, from the second client computer via the network interface, the information descriptive of one or more interactions between the second client computer and at least one transcription system trainee;
      c) generate work product based on the transcription information and the information descriptive of one or more interactions; and
      d) display a feedback presentation to the at least one transcription system trainee via the graphical user interface, the feedback presentation indicating errors made by the at least one transcription system trainee and indicating corrections to the work product; and
   a training component executable by the at least one processor and configured to evaluate performance of the at least one transcription system trainee based on the work product and at least one modifiable rubric that indicates multiple valid transcriptions and to construct the feedback presentation based on the performance as evaluated by the training component.

2. The system according to claim 1, wherein the information descriptive of one or more interactions between the second client computer and the at least one transcription system trainee includes information descriptive of changes to the transcription information.

3. The system according to claim 1, wherein the training component is configured to evaluate the performance by, at least in part, comparing the at least one modifiable rubric to data descriptive of the work product.

4. The system according to claim 3, wherein the trainee interface is further configured to receive information descriptive of the work product.

5. The system according to claim 4, wherein the work product is at least one of an edited transcript, a set of captions, and a transcript annotated with metadata.

6. The system according to claim 3, wherein the trainee interface is further configured to:
   receive comments regarding the at least one modifiable rubric from an external entity; and
   notify another external entity of the comments via an administrator interface.

7. The system according to claim 6, wherein the training component is further configured to:
   compute a total number of comments received regarding the at least one modifiable rubric; and
   modify the at least one modifiable rubric if the total number transgresses a predetermined threshold.

8. The system according to claim 1, further comprising an auditor interface configured to present information descriptive of the performance to an external entity.

9. The system according to claim 8, wherein the auditor interface is further configured to receive feedback regarding the performance from the external entity.

10. The system according to claim 1, wherein the training component is further configured to identify the performance as being at least one of a failure, a success, and requiring further analysis.

11. The system according to claim 10, wherein the training component is configured to identify the performance by, at least in part, computing a score indicative of the performance.

12. The system according to claim 10, wherein the training component is further configured to generate comments regarding the performance that include information from the work product.

13. A method of training transcription system trainees to edit computer generated transcription information executed by a server computer including a memory and a network interface configured to exchange information with a first client computer and a second client computer, the method comprising:
   executing an automatic speech recognition (ASR) component, a trainee interface, and a training component;
   receiving, via the network interface, at least one media the from the first client computer, the at least one media the including audio or audiovisual information;
   generating, via the ASR component, transcription information from the at least one media file;
   storing, via the ASR component, the transcription information in the memory;
   displaying, via the second client computer, the transcription information and the at least one media file;
   receiving, from the second client computer via the trainee interface, information descriptive of one or more interactions between the second client computer and at least one transcription system trainee;
   generating, via the trainee interface, work product based on the transcription information and the information descriptive of one or more interactions; and
   evaluating, via the training component, performance of the at least one transcription system trainee based on the work product and at least one modifiable rubric that indicates multiple valid transcriptions;
   generating, via the training component, a feedback presentation based on the performance as evaluated by the training component, the feedback presentation indicating errors made by the at least one transcription system trainee and indicating corrections to the work product; and
   displaying, via the second client computer, the feedback presentation to the at least one transcription system trainee.

14. The method according to claim 13, wherein evaluating the performance includes evaluating changes to the transcription information.

15. The method according to claim 13, wherein evaluating the performance includes comparing the at least one modifiable rubric to data descriptive of the work product.

16. The method according to claim 15, further comprising receiving information descriptive of the work product.

17. The method according to claim 16, wherein comparing the at least one modifiable rubric to the data descriptive of work product includes comparing the at least one modifiable rubric to data descriptive of at least one of an edited transcript, a set of captions, and a transcript annotated with metadata.

18. The method according to claim 15, further comprising:
receiving comments regarding the at least one modifiable rubric from an external entity; and
notifying another external entity of the comments via an administrator interface.

19. The method according to claim 18, further comprising:
computing a total number of comments received regarding the at least one modifiable rubric; and
modifying the at least one modifiable rubric if the total number transgresses a predetermined threshold.

20. The method according to claim 13, further comprising presenting information descriptive of the performance to an external entity.

21. The method according to claim 20, further comprising receiving feedback regarding the performance from the external entity.

22. The method according to claim 13, further comprising identifying the performance as being at least one of a failure, a success, and requiring further analysis.

23. The method according to claim 22, wherein identifying the performance includes computing a score indicative of the performance.

24. The method according to claim 22, wherein further comprising generating comments regarding the performance that include information from the work product.

25. A non-transitory computer readable medium storing instructions for executing a training process for transcription system trainees, the instructions being executable by at least one processor of a server computer including a memory and a network interface configured to exchange information with a first client computer and a second client computer, the instructions instructing the server computer to:
execute an automatic speech recognition (ASR) component, a trainee interface, and a training component;
receive, via the network interface, at least one media the from the first client computer, the at least one media the including audio or audiovisual information;
generate, via the ASR component, transcription information from at least one media file;
store, via the ASR component, the transcription information in a memory;
display, via the second client computer, the transcription information and the at least one media file;
receive, from the second client computer via the trainee interface, information descriptive of one or more interactions between the second client computer and at least one transcription system trainee;
generate, via the training component, work product based on the transcription information and the information descriptive of one or more interactions; and
evaluate, via the training component, performance of at least one transcription system trainee based on the work product and at least one modifiable rubric that indicates multiple valid transcriptions;
generate, via the training component, a feedback presentation based on the performance as evaluated by the training component, the feedback presentation indicating errors made by the at least one transcription system trainee and indicating corrections to the work product; and
display, via the second client computer, the feedback presentation to the at least one transcription system trainee.

26. The computer readable medium according to claim 25, wherein the instructions to evaluate the performance include instructions to compare the at least one modifiable rubric to data descriptive of the work product.

* * * * *

UNITED STATES PATENT AND TRADEMARK OFFICE
CERTIFICATE OF CORRECTION

PATENT NO. : 9,576,498 B1  
APPLICATION NO. : 13/839008  
DATED : February 21, 2017  
INVENTOR(S) : Roger S. Zimmerman et al.

Page 1 of 1

It is certified that error appears in the above-identified patent and that said Letters Patent is hereby corrected as shown below:

In the Claims

In Column 36, Line 8, Claim 25 replace "at least one media the" with --at least one media file--

In Column 36, Line 9, Claim 25 replace "at least one media the" with --at least one media file--

Signed and Sealed this  
Second Day of May, 2017

Michelle K. Lee  
*Director of the United States Patent and Trademark Office*